United States Patent
Huang

(10) Patent No.: US 12,393,670 B2
(45) Date of Patent: Aug. 19, 2025

(54) APPLICATION LOGIN METHOD, METHOD FOR ACCESSING APPLICATION SERVER BY APPLICATION, AND ELECTRONIC DEVICE

(71) Applicant: Petal Cloud Technology Co., Ltd., Dongguan (CN)

(72) Inventor: Rongjun Huang, Nanjing (CN)

(73) Assignee: PETAL CLOUD TECHNOLOGY CO., LTD., Dongguan (CN)

( * ) Notice: Subject to any disclaimer, the term of this patent is extended or adjusted under 35 U.S.C. 154(b) by 500 days.

(21) Appl. No.: 17/780,900

(22) PCT Filed: Nov. 19, 2020

(86) PCT No.: PCT/CN2020/130155
§ 371 (c)(1),
(2) Date: May 27, 2022

(87) PCT Pub. No.: WO2021/104152
PCT Pub. Date: Jun. 3, 2021

(65) Prior Publication Data
US 2023/0025658 A1     Jan. 26, 2023

(30) Foreign Application Priority Data
Nov. 29, 2019    (CN) .......................... 201911198504.8

(51) Int. Cl.
G06F 21/45    (2013.01)
G06F 21/41    (2013.01)
(52) U.S. Cl.
CPC .............. *G06F 21/45* (2013.01); *G06F 21/41* (2013.01)

(58) Field of Classification Search
CPC ...... G06F 21/45; G06F 21/41; G06F 21/6218; G06F 21/6245; G06F 21/604;
(Continued)

(56) References Cited

U.S. PATENT DOCUMENTS

2004/0083307 A1 * 4/2004 Uysal .................. H04L 67/52
709/246
2007/0245007 A1 * 10/2007 Tsirtsis .................. H04W 8/04
709/223

(Continued)

FOREIGN PATENT DOCUMENTS

CN     1805355 A      7/2006
CN     101047955 A    10/2007
(Continued)

OTHER PUBLICATIONS

Hardt, D., Ed., "The OAuth 2.0 Authorization Framework," RFC 6749, Oct. 2012, 76 pages.

*Primary Examiner* — Han Yang
(74) *Attorney, Agent, or Firm* — Conley Rose, P.C.

(57) ABSTRACT

An application login method for accessing an application server by an application includes techniques for an authentication server to complete login authentication on a client application based on authorization request information of the client application in a login request received from a client terminal, determining an application server in a user home country/region of the client application based on user home country/region identification information of the client application in the login request, generating and sending access information about the application server in the user home country/region of the client application.

20 Claims, 11 Drawing Sheets

Receive a login request from a client application, where the login request includes authorization request information of the client application and user home country/region identification information of the client application, and the authorization request information is used to obtain login authentication from an authentication server — S201

Generate, based on the login request, authorization information used to respond to the authorization request information and access information, confirmed based on the user home country/region identification information, of an application server in a user home country/region of the client application, and send the authorization information and the access information — S202

(58) Field of Classification Search
CPC ..... G06F 2221/2111; G06F 2221/2141; H04L 63/107
See application file for complete search history.

(56) References Cited

U.S. PATENT DOCUMENTS

| | | | | |
|---|---|---|---|---|
| 2016/0227471 A1* | 8/2016 | De Foy | ................. | H04W 48/18 |
| 2019/0199723 A1* | 6/2019 | Tak | ..................... | H04L 63/0892 |
| 2023/0025658 A1 | 1/2023 | Huang | | |

FOREIGN PATENT DOCUMENTS

| | | | |
|---|---|---|---|
| CN | 101355800 | A | 1/2009 |
| CN | 101631146 | A | 1/2010 |
| CN | 103347062 | A | 10/2013 |
| CN | 105072133 | A | 11/2015 |
| CN | 106815099 | A | 6/2017 |
| CN | 110417863 | A | 11/2019 |
| CN | 110990868 | A | 4/2020 |
| EP | 2290884 | A1 | 3/2011 |

* cited by examiner

APPLICATION LOGIN METHOD, METHOD FOR ACCESSING APPLICATION SERVER BY APPLICATION, AND ELECTRONIC DEVICE

This is a U.S. National Stage of International Patent Application No. PCT/CN2020/130155, filed on Nov. 19, 2020, which claims priority to Chinese Patent Application No. 201911198504.8, filed on Nov. 29, 2019. Both of the aforementioned applications are hereby incorporated by reference in their entireties

TECHNICAL FIELD

This application relates to the communications field, and in particular, to an application login method, a method for accessing an application server by an application, and an electronic device.

BACKGROUND

As user data protection regulations, such as the GDPR (General Data Protection Regulation, General Data Protection Regulation), are required, mobile Internet services are facing unprecedented privacy compliance challenges in the global development. According to a privacy compliance requirement, a client application (namely, a client APP) needs to access an application server in a user home country/region of the client application (including storing related data on the application server in the user home country/region of the client application, and the like). For example, a client application is oriented towards users both in the Asia-Pacific region and the European region. If a user of the client application belongs to the Asia-Pacific region, the client application needs to access an application server in the Asia-Pacific region. If a user belongs to the European region, the client application needs to access an application server in the European region. However, at present, there is often a problem that a client application cannot accurately access an application server in a user home country/region of the client application.

SUMMARY

This application provides an application login method, a method for accessing an application server by an application, and an electronic device, so that a client application can accurately access an application server in a user home country/region of the client application, to satisfy a privacy compliance requirement.

To resolve the foregoing technical problem, according to a first aspect, an implementation of this application provides an application login method, including: A client terminal sends a login request, where the login request includes authorization request information of a client application executed in the client terminal and user home country/region identification information of the client application. An authentication server receives the login request, generates, based on the login request, authorization information used to respond to the authorization request information and access information, confirmed based on the user home country/region identification information, of an application server in a user home country/region of the client application, and sends the authorization information and the access information to the client terminal. The client terminal receives the authorization information and the access information, and enables the client application to access the application server in the user home country/region of the client application based on the authorization information and the access information.

When the client application logs in, the authentication server receives the login request of the client application sent by the client terminal, may complete login authentication on the client application by using the authorization request information in the login request, and generates the authorization information in response to the authorization request information. Based on the user home country/region identification information of the client application in the login request, the authentication server may determine the application server in the user home country/region of the client application, and generate the access information about the application server in the user home country/region of the client application. The authentication server sends the authorization information and the access information to the client terminal, so that the client application executed in the client terminal can accurately access the application server in the user home country/region of the client application based on the access information, to satisfy a privacy compliance requirement, thereby effectively improving user privacy security. In addition, the client application may complete login authentication with the application server based on the authorization information.

In a possible implementation of the first aspect, the authorization request information includes information for requesting to obtain an authorization code, initially configured address information of the application server of the client application, and an application ID of the client application.

In a possible implementation of the first aspect, the authentication server is an authentication server in a region determined based on the initially configured address information of the application server of the client application, and the region in which the authentication server is located is inconsistent with the user home country/region.

According to a second aspect, an implementation of this application provides an application login method, including: A client terminal sends a login request, where the login request includes authorization request information that is used by another client application executed in the client terminal to request to log in by using a user account of a client application executed in the client terminal and user home country/region identification information of the client application. An authentication server receives the login request, generates, based on the login request, authorization information used to respond to the authorization request information and access information, confirmed based on the user home country/region identification information, of an application server that is used for the another client application and that is in a user home country/region of the client application, and sends the authorization information and the access information to the client terminal. The client terminal receives the authorization information and the access information, and sends the authorization information and the access information to the another client application by using the client application, so that the another client application accesses, based on the authorization information and the access information, the application server used for the another client application.

When the another client application executed in the client terminal logs in by using the user account of the client application executed in the client terminal, the authentication server receives the login request of the client application sent by the client terminal, may complete login authentication on the another client application by using the authorization request information in the login request, and generates the authorization information in response to the authorization request information. In addition, the authentication server generates the access information, confirmed based on the user home country/region identification information of the client application in the login request, of the application server that is used for the another client application and that is in the user home country/region of the client application. The authentication server sends the authorization information and the access information to the another client application by using the client application in the client terminal, so that the another client application can accurately access, based on the access information, the application server that is in a privacy compliance region and that the another client application needs to access, to satisfy a privacy compliance requirement, thereby effectively improving user privacy security. In addition, the another client application may complete login authentication with the application server based on the authorization information.

In a possible implementation of the second aspect, the authorization request information includes information for requesting to obtain an authorization code, initially configured address information of the application server of the another client application, and an application ID of the another client application.

In a possible implementation of the second aspect, the authentication server is an authentication server in a region determined based on the initially configured address information of the application server of the another client application, and the region in which the authentication server is located is inconsistent with the user home country/region.

According to a third aspect, an implementation of this application provides an application login method. The method is applied to an authentication server and includes: receiving a login request from a client application, where the login request includes authorization request information of the client application and user home country/region identification information of the client application, and the authorization request information is used to obtain login authentication from the authentication server; and generating, based on the login request, authorization information used to respond to the authorization request information and access information, confirmed based on the user home country/region identification information, of an application server in a user home country/region of the client application, and sending the authorization information and the access information.

When the client application logs in, the authentication server receives the login request from the client application, may complete login authentication on the client application by using the authorization request information in the login request, and generates the authorization information in response to the authorization request information. Based on the user home country/region identification information of the client application in the login request, the authentication server may determine the application server in the user home country/region of the client application, and generate the access information about the application server in the user home country/region of the client application. The authentication server sends the authorization information and the access information to the client application, so that the client application can accurately access the application server in the user home country/region of the client application based on the access information, to satisfy a privacy compliance requirement, thereby effectively improving user privacy security. In addition, the client application may complete login authentication with the application server based on the authorization information.

In a possible implementation of the third aspect, the access information and the authorization information are combined into information for feeding back the login request, and then the information for feeding back the login request is sent. In this way, the access information and the authorization information can be sent by sending only one piece of information, thereby effectively improving communication efficiency.

In a possible implementation of the third aspect, the method further includes: determining a user home country/region of the client application based on the user home country/region identification information, determining address information of the application server based on a locally configured correspondence between a home country/region and an application server address, and generating the access information including the address information of the application server. The user home country/region of the client application may be determined based on the user home country/region identification information, an address of the application server in the user home country/region of the client application can be accurately determined based on the correspondence that is between a home country/region and an application server address and that is locally configured on the authentication server, and the address is sent to the client application by using the access information, so that the client application can accurately access the application server in the user home country/region of the client application based on the address, to satisfy the privacy compliance requirement, thereby effectively improving the user privacy security.

In a possible implementation of the third aspect, the address information of the application server is configured by using a callback address parameter. The address information can be sent conveniently by returning the address information by using the callback address parameter.

In a possible implementation of the third aspect, the authorization request information includes information for requesting to obtain an authorization code, initially configured address information of the application server of the client application, and an application ID of the client application.

In a possible implementation of the third aspect, the authentication server is an authentication server in a region determined based on the initially configured address information of the application server of the client application, and the region in which the authentication server is located is inconsistent with the user home country/region.

In a possible implementation of the third aspect, the authorization information includes the authorization code.

In a possible implementation of the third aspect, the user home country/region identification information is information that can identify the user home country/region of the client application. The user home country/region identification information includes at least one of account information of a user of the client application, a distribution channel of the client application, a source IP address requested by the client application, and terminal information of a client terminal (including information such as a place of production/delivery of the device) in which the client application is located.

According to a fourth aspect, an implementation of this application provides an application login method. The method is applied to an authentication server and includes: receiving a login request from a client application, where the login request includes authorization request information that is used by another client application to request to log in by using a user account of the client application and user home country/region identification information of the client application, and the authorization request information is used to obtain, from the authentication server, login authentication on the another client application that requests to log in by using the user account of the client application; and generating, based on the login request, authorization information used to respond to the authorization request information and access information, confirmed based on the user home country/region identification information, of an application server that is used for the another client application and that is in a user home country/region of the client application, and sending the authorization information and the access information to the another client application by using the client application.

When the another client application logs in by using the user account of the client application, the authentication server receives the login request from the client application, may complete login authentication on the another client application by using the authorization request information in the login request, and generates the authorization information in response to the authorization request information. In addition, the authentication server generates the access information, confirmed based on the user home country/region identification information of the client application in the login request, of the application server that is used for the another client application and that is in the user home country/region of the client application. The authentication server sends the authorization information and the access information to the another client application by using the client application, so that the another client application can accurately access, based on the access information, the application server that is in a privacy compliance region and that the another client application needs to access, to satisfy a privacy compliance requirement, thereby effectively improving user privacy security. In addition, the another client application may complete login authentication with the application server based on the authorization information.

In a possible implementation of the fourth aspect, the access information and the authorization information are combined into information for feeding back the login request, and then the information for feeding back the login request is sent. In this way, the access information and the authorization information can be sent by sending only one piece of information, thereby effectively improving communication efficiency.

In a possible implementation of the fourth aspect, the method further includes: determining a user home country/region of the client application based on the user home country/region identification information, determining, based on a locally configured correspondence between a home country/region and an application server address, an address of the application server used for the another client application, and generating the access information including address information of the application server used for the another client application. The user home country/region of the client application may be determined based on the user home country/region identification information, the address of the application server that is used for the another client application to access and that is in the user home country/region of the client application can be accurately determined based on the correspondence that is between a home country/region and an application server address and that is locally configured on the authentication server, and the address is sent to the another client application by using the access information, so that the another client application can accurately access, based on the address, the application server that is in the privacy compliance region and that the another client application needs to access, to satisfy the privacy compliance requirement, thereby effectively improving the user privacy security.

In a possible implementation of the fourth aspect, the address information of the application server used for the another client application is configured by using a callback address parameter. The address information can be sent conveniently by returning the address information by using the callback address parameter.

In a possible implementation of the fourth aspect, the authorization request information includes information for requesting to obtain an authorization code, initially configured address information of the server of the another client application, and an application ID of the another client application.

In a possible implementation of the fourth aspect, the authentication server is an authentication server in a region determined based on the initially configured address information of the application server of the another client application, and the region in which the authentication server is located is inconsistent with the user home country/region.

In a possible implementation of the fourth aspect, the authorization information includes the authorization code.

In a possible implementation of the fourth aspect, the user home country/region identification information is information that can identify the user home country/region of the client application. The user home country/region identification information includes at least one of account information of a user of the client application, a distribution channel of the client application, a source IP address requested by the client application, and terminal information of a client terminal (including information such as a place of production/delivery of the device) in which the client application is located.

According to a fifth aspect, an implementation of this application provides a method for accessing an application server by an application. The method is applied to a client terminal and includes: sending a login request, where the login request includes authorization request information of a client application and user home country/region identification information of the client application, and the authorization request information is used to obtain login authentication from an authentication server; receiving, from the authentication server, authorization information used to respond to the authorization request information and access information, confirmed based on the user home country/region identification information, of an application server in a user home country/region of the client application, where the authorization information and the access information are generated by the authentication server based on the login request; and accessing the application server in the user home country/region of the client application based on the authorization information and the access information.

When the client application performs authentication login, the client application sends the login request to the authentication server. After receiving the login request, the authentication server may complete login authentication on the client application by using authorization request information in the login request, and generates the authorization information in response to the authorization request information. Based on the user home country/region identification information of the client application in the login request, the authentication server may determine the application server in the user home country/region of the client application, and generate the access information about the application server in the user home country/region of the client application. The authentication server sends the authorization information and the access information to the client application, so that the client application can accurately access the application server in the user home country/region of the client application based on the access information, to satisfy a privacy compliance requirement, thereby effectively improving user privacy security. In addition, the client application may complete login authentication with the application server based on the authorization information.

According to a sixth aspect, an implementation of this application provides a method for accessing an application server by an application. The method is applied to a client terminal and includes: sending a login request, where the login request includes authorization request information that is used by another client application to request to log in by using a user account of a client application and user home country/region identification information of the client application, and the authorization request information is used to obtain, from an authentication server, login authentication on the another client application that requests to log in by using the user account of the client application: receiving, from the authentication server, authorization information used to respond to the authorization request information and access information, confirmed based on the user home country/region identification information, of an application server that is used for the another client application and that is in a user home country/region of the client application, where the authorization information and the access information are generated by the authentication server based on the login request; and forwarding the authorization information and the access information to the another client application, so that the another client application accesses, based on the authorization information and the access information, the application server used for the another client application.

When the another client application logs in by using the user account of the client application, the another client application sends a request to the client application. After receiving the request, the client application sends the login request to the authentication server. The authentication server receives the login request, may complete login authentication on the another client application by using the authorization request information in the login request, and generates the authorization information in response to the authorization request information. In addition, the authentication server generates the access information, confirmed based on the user home country/region identification information of the client application in the login request, of the application server that is used for the another client application and that is in the user home country/region of the client application. The authentication server sends the authorization information and the access information to the another client application by using the client application, so that the another client application can accurately access, based on the access information, the application server that is in a privacy compliance region and that the another client application needs to access, to satisfy a privacy compliance requirement, thereby effectively improving user privacy security. In addition, the another client application may complete login authentication with the application server based on the authorization information.

According to a seventh aspect, an implementation of this application provides an authentication server. The authentication server includes: a receiving module, configured to receive a login request from a client application, where the login request includes authorization request information of the client application and user home country/region identification information of the client application, and the authorization request information is used to obtain login authentication from the authentication server; a processing module, configured to generate, based on the login request, authorization information used to respond to the authorization request information and access information, confirmed based on the user home country/region identification information, of an application server in a user home country/region of the client application; and a sending module, configured to send the authorization information and the access information.

The authentication server provided in this application includes modules configured to perform the application login method provided in any one of the third aspect and/or the possible implementations of the third aspect, and therefore can also achieve beneficial effects (or advantages) of the application login method provided in the third aspect.

According to an eighth aspect, an implementation of this application provides an authentication server. The authentication server includes: a receiving module, configured to receive a login request from a client application, where the login request includes authorization request information that is used by another client application to request to log in by using a user account of the client application and user home country/region identification information of the client application, and the authorization request information is used to obtain, from the authentication server, login authentication on the another client application that requests to log in by using the user account of the client application; a processing module, configured to generate, based on the login request, authorization information used to respond to the authorization request information and access information, confirmed based on the user home country/region identification information, of an application server that is used for the another client application and that is in a user home country/region of the client application; and a sending module, configured to send the authorization information and the access information to the another client application by using the client application.

The authentication server provided in this application includes modules configured to perform the application login method provided in any one of the fourth aspect and/or the possible implementations of the fourth aspect, and therefore can also achieve beneficial effects (or advantages) of the application login method provided in the fourth aspect.

According to a ninth aspect, an implementation of this application provides a client terminal, including: a sending module, configured to send a login request, where the login request includes authorization request information of a client application and user home country/region identification information of the client application, and the authorization request information is used to obtain login authentication from an authentication server; a receiving module, configured to receive, from the authentication server, authorization information used to respond to the authorization request information and access information, confirmed based on the user home country/region identification information, of an application server in a user home country/region of the client application, where the authorization information and the access information are generated by the authentication server based on the login request; and an access processing module, configured to access the application server in the user home country/region of the client application based on the authorization information and the access information.

The client terminal provided in this application includes modules configured to perform the method for accessing an application server by an application provided in any one of the fifth aspect and/or the possible implementations of the fifth aspect, and therefore can also achieve beneficial effects (or advantages) of the method for accessing an application server by an application provided in the fifth aspect.

According to a tenth aspect, an implementation of this application provides a client terminal, including: a sending module, configured to send a login request, where the login request includes authorization request information that is used by another client application to request to log in by using a user account of a client application and user home country/region identification information of the client application, and the authorization request information is used to obtain, from an authentication server, login authentication on the another client application that requests to log in by using the user account of the client application; a receiving module, configured to receive, from the authentication server, authorization information used to respond to the authorization request information and access information, confirmed based on the user home country/region identification information, of an application server that is used for the another client application and that is in a user home country/region of the client application, where the authorization information and the access information are generated by the authentication server based on the login request; and an access processing module, configured to forward the authorization information and the access information to the another client application, so that the another client application accesses, based on the authorization information and the access information, the application server used for the another client application.

The client terminal provided in this application includes modules configured to perform the method for accessing an application server by an application provided in any one of the sixth aspect and/or the possible implementations of the sixth aspect, and therefore can also achieve beneficial effects (or advantages) of the method for accessing an application server by an application provided in the sixth aspect.

According to an eleventh aspect, an implementation of this application provides a communications system, including an authentication server and a client terminal. The authentication server is the authentication server in the seventh aspect, and the client terminal is the client terminal in the ninth aspect. Alternatively, the authentication server is the authentication server in the eighth aspect, and the client terminal is the client terminal in the tenth aspect.

The communications system provided in this application includes the authentication server configured to perform the application login method provided in any one of the possible implementations and the client terminal configured to perform the method for accessing an application server by an application provided in any one of the possible implementations, and therefore can also achieve beneficial effects (or advantages) corresponding to the application login method and the method for accessing an application server by an application.

According to a twelfth aspect, an implementation of this application provides an electronic device, including: a memory, configured to store a computer program, where the computer program includes program instructions; and a processor, configured to execute the program instructions, so that the electronic device performs the foregoing application login method, or the electronic device performs the foregoing method for accessing an application server by an application.

According to a thirteenth aspect, an implementation of this application provides a computer-readable storage medium. The computer-readable storage medium stores a computer program, the computer program includes program instructions, and the program instructions are run by a computer, so that the computer performs the foregoing application login method or the foregoing method for accessing an application server by an application.

BRIEF DESCRIPTION OF DRAWINGS

To describe the technical solutions in the embodiments of this application more clearly, the following briefly describes the accompanying drawings for describing the embodiments.

DESCRIPTION OF EMBODIMENTS

Figure 1:
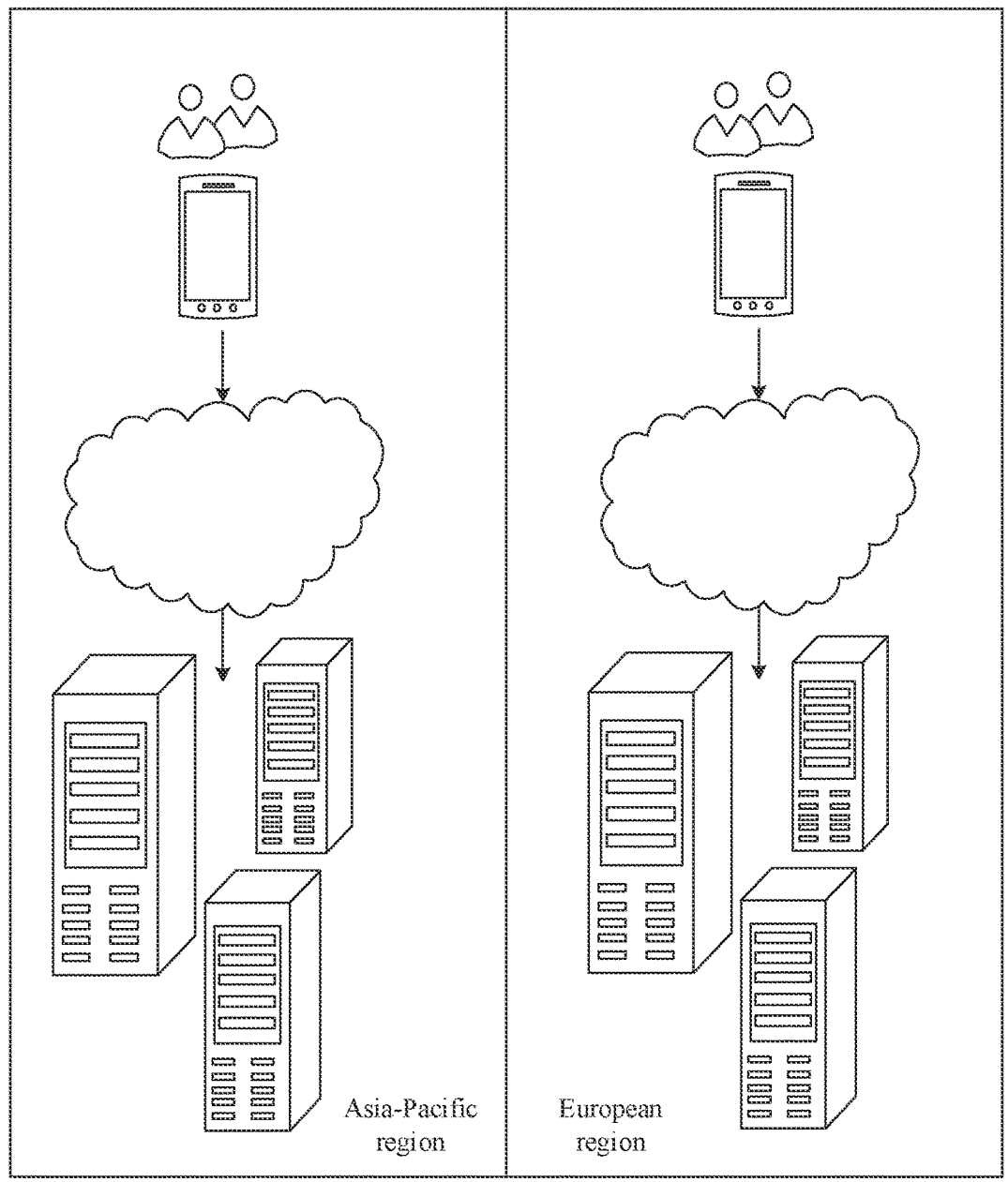
FIG. 1 is a scenario diagram of accessing an application server by an application according to some embodiments of this application.

The following describes implementations of this application by using specific embodiments. A person skilled in the art may easily learn of other advantages and effects of this application based on content disclosed in this specification. Although this application is described with reference to embodiments, this does not mean that features of this application are limited to the implementations. On the contrary, a purpose of describing this application with reference to an implementation is to cover another option or modification that may be derived based on claims of this application. To provide an in-depth understanding of this application, the following description includes many specific details. This application may be alternatively implemented without using these details. In addition, to avoid confusion or blurring the focus of this application, some specific details will be omitted from the description. It should be noted that, the embodiments in this application and features of the embodiments may be mutually combined w % ben they do not conflict with each other.

It should be noted that, in this specification, reference numerals and letters in the following accompanying drawings represent similar items. Therefore, once an item is defined in an accompanying drawing, the item does not need to be further defined or interpreted in subsequent accompanying drawings.

To make the objectives, technical solutions, and advantages of this application clearer, the following further describes the implementations of this application in detail with reference to the accompanying drawings.

At present, there is often a problem that a client application cannot accurately access an application server in a user home country/region of the client application.

In one manner, when an Internet service is provided for users in different regions, a common practice is that application server addresses of different regions are different, and the users in the different regions are provided with client application versions used to access only application server addresses of local regions. FIG. 1 is a scenario diagram of accessing an application server by an application. For example, a service provides an Internet service in the Asia-Pacific region and the European region. To satisfy a privacy compliance requirement, an application server is deployed in the Asia-Pacific region to provide services for users in the Asia-Pacific region, and an application server is deployed in the European region to provide services for users in the European region. Address domain names of the application servers in the Asia-Pacific region and the European region are different domain names (for example, an address domain name of the Asia-Pacific region is as.example.com, and an address domain name of the European region is eu.example.com). Therefore, the domain name of the application server in the Asia-Pacific region is preset for a client application oriented towards the users in the Asia-Pacific region, and the domain name of the application server in the European region is preset for a client application oriented towards the users in the European region. The client applications access corresponding application servers based on the preset domain names of the application servers. This ensures that the client applications used by the users in the two regions correctly access the application servers.

In this manner, a user may install a client application version provided for users in another region. For example, a European user downloads and installs a version provided for Asia-Pacific users. Consequently, personal data of the European user is stored on the application server in the Asia-Pacific region. This causes a privacy compliance risk. In addition, providing different versions for different regions increases development and maintenance costs.

Figure 2:
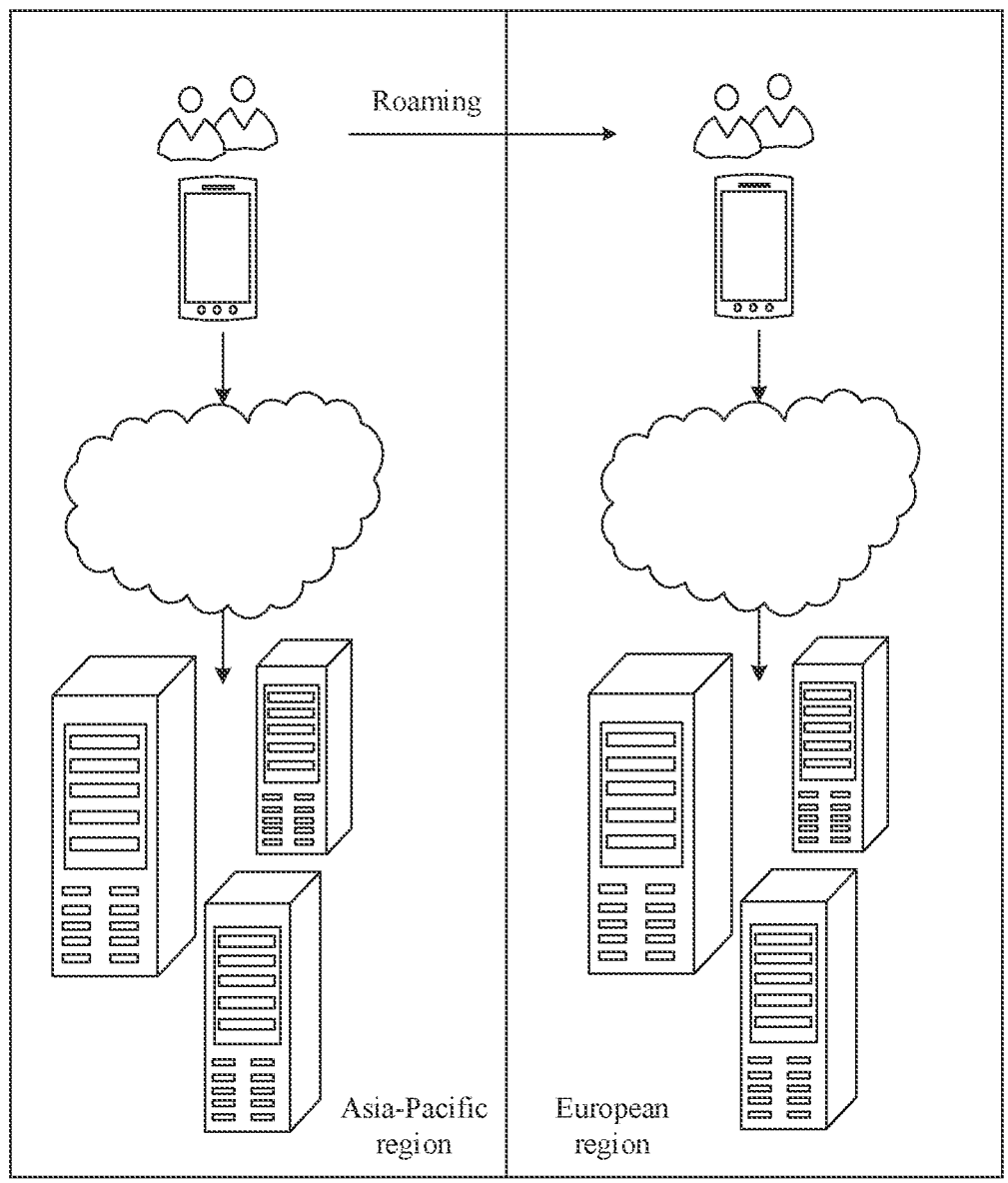
FIG. 2 is another scenario diagram of accessing an application server by an application according to some embodiments of this application.

In another manner, client applications do not differentiate between versions for different regions, and the client applications with only a global unified version are provided. A same address domain name (for example, www.example.com) is set for application servers deployed in various regions, and a client application uses the address domain name to access a nearest application server. FIG. 2 is another scenario diagram of accessing an application server by an application. For example, a service provides an Internet service in the Asia-Pacific region and the European region. To satisfy a privacy compliance requirement, an application server is deployed in the Asia-Pacific region to provide services for users in the Asia-Pacific region, and an application server is deployed in the European region to provide services for users in the European region. However, address domain names of the application servers in the Asia-Pacific region and the European region are a same domain name, and the same address domain name is preset for the client applications. When a user is located in the Asia-Pacific region and uses a client application to access an application server, a DNS (Domain Name System, domain name system) server resolves the address domain name into an IP address of the application server in the Asia-Pacific region, and then the client application establishes a link to the application server in the Asia-Pacific region. When a user travels to or is on business in the European region (roaming to the European region), and uses the same client application to access an application server, the DNS server resolves the address domain name into an IP address of the application server in the European region, and then the client application establishes a connection to the application server in the European region.

In this manner, after a user roams from one region to another, a client application accesses an application server in the roaming region. Consequently, personal data of the user is stored on the application server in the roaming region, and the like. This causes a privacy compliance risk.

The foregoing two existing methods for accessing an application server by a client application both have a problem that a privacy compliance risk is caused because a client application cannot accurately access an application server in a user home country/region of the client application.

This application provides an application login method different from that in the conventional technology, so that a client application can accurately access an application server in a user home country/region of the client application, thereby complying with a privacy compliance requirement.

Figure 3:
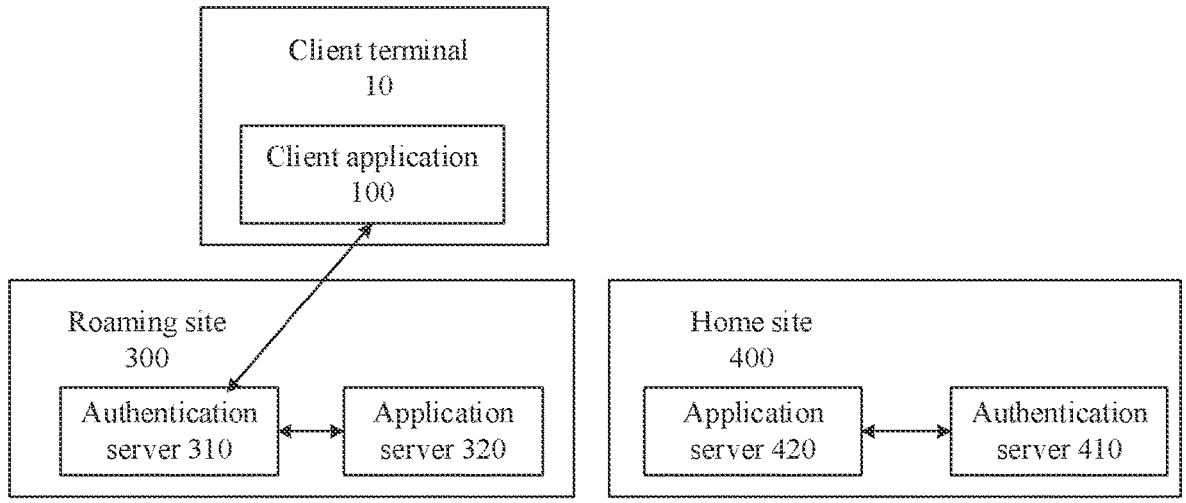
FIG. 3 is a scenario diagram of application login and accessing an application server by an application according to some embodiments of this application.

FIG. 3 is a scenario diagram of application login and accessing an application server by an application according to an embodiment of this application. For example, a client terminal 10 (a client application 100 is disposed on the client terminal 10), a roaming site 300, and a home site 400 are included in this scenario. An authentication server 310 is deployed in the roaming site 300, and an application server 420 is deployed in the home site 400. The home site 400 is a region that actually needs to be accessed by the client application 100 to comply with a privacy compliance requirement. The roaming site 300 is a region that is accessed by the client application 100 during login and that is other than the region that actually needs to be accessed. Further, an application server 320 may be deployed in the roaming site 300, and an authentication server 410 may be deployed in the home site 400.

An embodiment provides an application login method. The application login method enables a client application to accurately access an application server that the client application needs to access to satisfy a privacy compliance requirement, thereby complying with the privacy compliance requirement.

Figure 4:
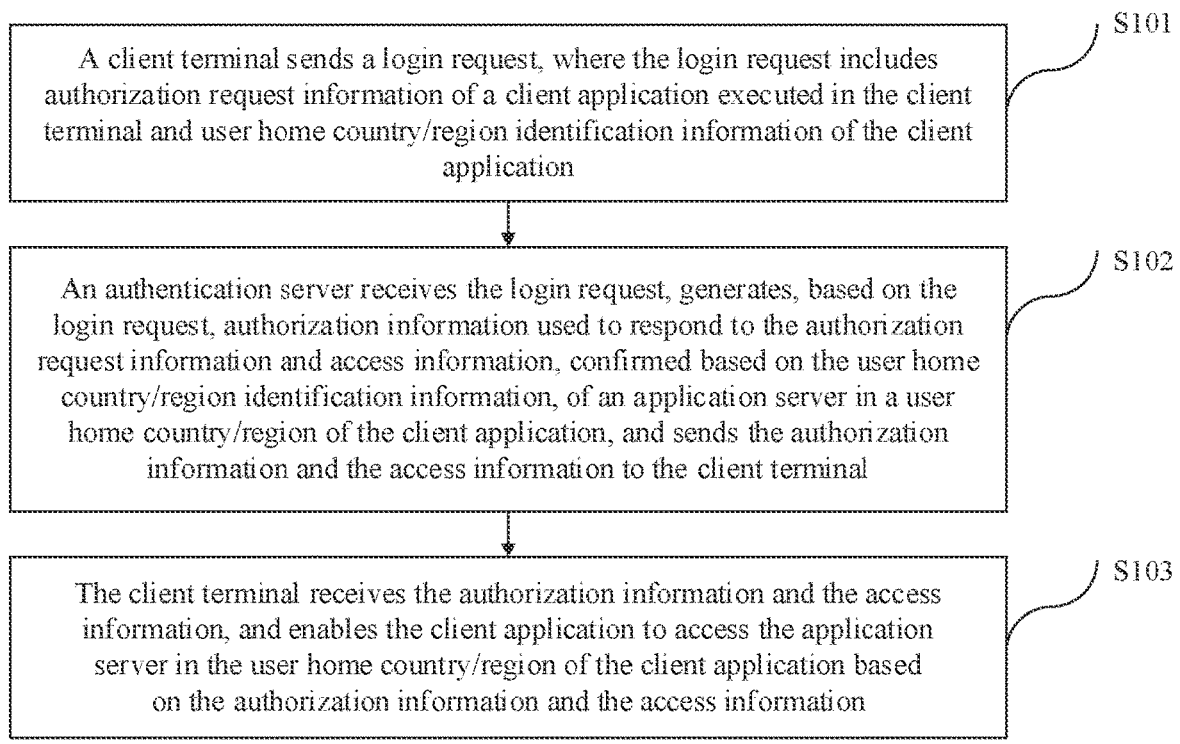
FIG. 4 is a method flowchart of an application login method according to some embodiments of this application.

FIG. 4 is a method flowchart of an application login method according to an implementation of this application. The method specifically includes the following steps.

S101: A client terminal sends a login request, where the login request includes authorization request information of a client application executed in the client terminal and user home country/region identification information of the client application.

S102: An authentication server receives the login request, generates, based on the login request, authorization information used to respond to the authorization request information and access information, confirmed based on the user home country/region identification information, of an application server in a user home country/region of the client application, and sends the authorization information and the access information to the client terminal.

S103: The client terminal receives the authorization information and the access information, and enables the client application to access the application server in the user home country/region of the client application based on the authorization information and the access information.

For example, the authorization request information includes information for requesting to obtain an authorization code, initially configured address information of the application server of the client application, and an application ID of the client application.

For example, in a possible implementation of this implementation, the home country/region identification information is information that can identify the user home country/region of the client application. The user home country/region identification information includes at least one of account information of a user of the client application, a distribution channel of the client application, a source IP address requested by the client, and terminal information of the client terminal (including information such as a place of production/delivery of the device) in which the client application is located.

For example, in a possible implementation of this implementation, the authorization information includes the authorization code.

For example, in a possible implementation of this implementation, the authentication server is an authentication server in a region determined based on the initially configured address information of the application server of the client application, and the region in which the authentication server is located is inconsistent with the user home country/region.

Specifically, in a possible implementation of this implementation, the client terminal may be specifically the client terminal 10 shown in FIG. 3, the client application may be specifically the client application 100, and the client application 100 is located in a roaming region other than the home country/region of the client application 100. In this case, the authentication server is the authentication server 310 (the authentication server 310 is an authentication server in the region in which the client application 100 is located, that is, the authentication server in the roaming site 300), and the application server in the user home country/region of the client application 100 may be specifically the application server 420 (that is, the application server 420 is the application server in the home site 400). The client application 100 uses a global unified version, and the address information that is of the application server of the client application 100 and that is initially configured in the client application 100 may be specifically, for example, www.example.com described above.

When the client application 100 logs in, the client terminal 10 in which the client application 100 is located accesses, based on the address information that is of the application server of the client application 100 and that is initially configured in the client application 100, the nearest authentication server 310 in the region (the roaming site 300) in which the client application 100 is located; sends, to the authentication server 310, the address information, information for obtaining the authorization code, and the application ID of the client application 100 that are jointly used as the authorization request information; and sends the user home country/region identification information of the client application 100 to the authentication server 310. In other words, the client terminal 10 sends the login request of the client application 100 to the authentication server 310. The authentication server 310 receives the login request from the client terminal 10, completes login authentication on the client application 100 by using the authorization request information in the login request, and generates the authorization information based on the authorization request information. The authentication server 310 may determine, based on the user home country/region identification information of the client application 100 in the login request, that the application server in the user home country/region of the client application 100 is the application server 420. The authentication server 310 generates the access information of the application server 200 in the user home country/region of the client application 100, and sends the authorization information and the access information to the client terminal 10. After receiving the access information, the client terminal 10 enables the client application 100 to accurately access the application server 420 in the user home country/region of the client application 100 based on the access information, to satisfy a privacy compliance requirement, thereby effectively improving user privacy security. In addition, the client terminal 10 sends the authorization information to the application server 420, so that the application server 420 may complete authentication on the client application 100 based on the authorization information.

It should be noted that the authentication server 310 may specifically generate and send the access information after completing authentication on the client application 100. If the authentication fails, the authentication server 310 may not generate the access information.

Further, the authentication server 310 performs authentication on the client application 100. The authentication server 310 may specifically perform authentication by using the authorization information, for example, determine, based on the application ID of the client application in the authorization request information, whether the client application is an authorized application (for example, determine whether the client application is a locally registered application). If the client application is an authorized application, the authentication succeeds; otherwise, the authentication fails.

For example, the authentication server 310 determines the user home country/region of the client application 100 based on the user home country/region identification information, determines address information of the application server 420 in the user home country/region of the client application 100 based on a locally configured correspondence between a home country/region and an application server address, and generates the access information including the address information of the application server 420. Specifically, the correspondence between a home country/region and an application server address may be preconfigured on the authentication server 310. Specifically, the correspondence may be configured in a form of a correspondence table (for example, an application server address corresponding to Singapore and Thailand is https://as.example.com/cb, and an application server address corresponding to the United Kingdom and Germany is https://eu.example.com/cb). The user home country/region of the client application 100 may be determined based on the user home country/region identification information (for example, based on the user home country/region identification information, if it is determined that a user is a Thai user, the home country/region of the client application 100 is Thailand). An address of the application server 420 in the user home country/region of the client application 100 (which is specifically https://as.example.com/cb) can be accurately determined based on the correspondence that is between a home country/region and an application server address and that is locally configured on the authentication server, and the address (https://as.example.com/cb) is sent to the client application 100 by using the access information, so that the client application 100 can accurately access the application server 420 in the user home country/region of the client application 100 based on the address, to satisfy the privacy compliance requirement, thereby effectively improving the user privacy security.

For example, the authentication server 310 determines the user home country/region of the client application 100 based on the user home country/region identification information. The user home country/region identification information may be specifically account information of a user, for example, a user name of the user. The authentication server 310 may determine, based on the user name, the user home country/region (or a registration country/region) corresponding to the user name. Alternatively, the user home country/region identification information may be a distribution channel of the client application, terminal information of the client terminal in which the client application is located, or the like. The authentication server 310 determines a place of origin of the client application based on the distribution channel of the client application, and uses the place of origin as the user home country/region of the client application. Alternatively, the authentication server 310 determines a place of production of the client terminal as the user home country/region of the client application based on the terminal information of the client terminal in which the client application is located.

It should be noted that an application developer may specifically configure the correspondence between a home country/region and an application server address on the authentication server by using a developer management platform or an application configuration platform. During configuration, the application developer specifically needs to configure the correspondence on authentication servers in various regions towards which the client application 100 is oriented. In this way, the client application 100 can obtain the address of the application server in the user home country/region of the client application 100 by accessing any application server.

For example, in a possible implementation of this implementation, the address information of the application server 420 is configured by using a callback address parameter. The address information can be sent conveniently by returning the address information by using the callback address parameter. The callback address parameter may be specifically edirect_uri=https://as.example.com/cb.

In another possible implementation of this implementation, the address information of the application server 420 may be configured by defining another parameter.

In another possible implementation of this implementation, the access information may include only the address information, and certainly may also include other information used for accessing the application server, depending on a requirement.

For example, in another possible implementation of this implementation, the access information and the authorization information are combined into information for feeding back the login request, and then the information for feeding back the login request is sent. In this way, the access information and the authorization information can be sent by sending only one piece of information, thereby effectively improving communication efficiency. Alternatively, depending on a requirement, the access information and the authorization information may be sent by using two pieces of information.

According to the application login method provided in this implementation, when the client application 100 accesses the nearest authentication server 310 in the region (the roaming site 300) in which the client application 100 is located, the authentication server 310 may determine the user home country/region based on user identification information of the client application 100, and then send the address information that is of the application server 420 of the client application 100 and that is corresponding to the home country/region to the client terminal 10, so that the client application 100 in the client terminal 10 can accurately access, based on the address information, the application server 420 that is in the region and that the client application 100 needs to access. In other words, even if the client application 100 roams to a region other than the home country/region of the client application 100 (that is, the client terminal 10 roams to a region other than the user home country/region), the client application 100 can still accurately access the application server 420 in the home country/region of the client application 100, thereby complying with the privacy compliance requirement.

It should be noted that, if the client application 100 is located in the home country/region of the client application 100, an authentication server accessed by the client application 100 for the first time is the authentication server in the home country/region of the client application 100 (that is, may be the authentication server 410 in the home site 400). In addition, the client application 100 may obtain the address information of the application server in the home country/region of the client application 100 by using the authentication server, and access the application server in the home country/region of the client application 100, to comply with a privacy compliance requirement.

Further, for example, in another possible implementation of this implementation, the client application 100 uses one of a plurality of versions for the client application that are provided for users in different regions. For example, the client application 100 uses an Asia-Pacific version provided for Asia-Pacific users, and in this case, the address information that is of the application server of the client application 100 and that is initially configured in the client application 100 may be specifically, for example, as.example.com described above. When the client application 100 logs in, the client terminal 10 in which the client application 100 is located accesses an authentication server in the Asia-Pacific region based on the address information (namely, as.example.com) that is of the application server of the client application 100 and that is initially configured in the client application 100, and then the authentication server in the Asia-Pacific region returns the access information of the application server in the user home country/region of the client application 100 to the client terminal 10. Specifically, if a user is a user in the European region, the authentication server in the Asia-Pacific region returns access information of an application server in the European region: or if a user is a user in the Asia-Pacific region, the authentication server in the Asia-Pacific region returns access information of an application server in the Asia-Pacific region.

According to the application login method provided in this implementation, if the user installs, on the client terminal 10, a client application version inconsistent with the version for the user home country/region, it can still be determined accurately that the application server in the user home country/region is used for access by the client application 100. In this way, the client application 100 can accurately access the application server that the client application 100 needs to access to satisfy a privacy compliance requirement, thereby complying with the privacy compliance requirement.

It should be noted that, according to the application login method provided in this implementation, if the user installs a client application version consistent with the version for the user home country/region, likewise, it can still be determined accurately that the application server in the user home country/region is used for access by the client application 100. In this way, the client application 100 can accurately access the application server that the client application 100 needs to access to satisfy a privacy compliance requirement, thereby complying with the privacy compliance requirement. An embodiment further provides an application login method, which is applied to an authentication server, so that a client application can accurately access an application server that the client application needs to access, thereby complying with a privacy compliance requirement.

Figure 5:
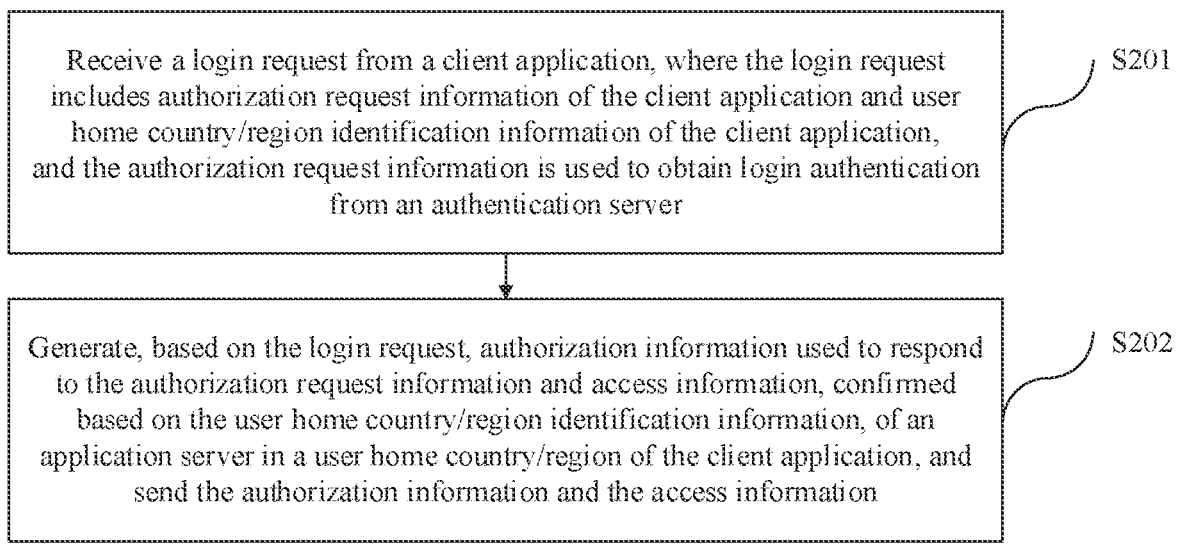
FIG. 5 is another method flowchart of an application login method according to some embodiments of this application.

FIG. 5 is a method flowchart of an application login method according to an implementation of this application. The method may be applied to an authentication server and specifically includes the following steps.

S201: Receive a login request from a client application, where the login request includes authorization request information of the client application and user home country/region identification information of the client application, and the authorization request information is used to obtain login authentication from the authentication server.

S202: Generate, based on the login request, authorization information used to respond to the authorization request information and access information, confirmed based on the user home country/region identification information, of an application server in a user home country/region of the client application, and send the authorization information and the access information.

For example, the authorization request information includes information for requesting to obtain an authorization code, initially configured address information of the application server of the client application, and an application ID of the client application.

For example, in a possible implementation of this implementation, the home country/region identification information is information that can identify the user home country/region of the client application 100. The user home country/region identification information includes at least one of account information of a user of the client application, a distribution channel of the client application, a source IP address requested by the client, and terminal information of a client terminal (including information such as a place of production/delivery of the device) in which the client application is located.

For example, in a possible implementation of this implementation, the authorization information includes the authorization code.

For example, in a possible implementation of this implementation, the authentication server is an authentication server in a region determined based on the initially configured address information of the application server of the client application, and the region in which the authentication server is located is inconsistent with the user home country/region.

Specifically, in a possible implementation of this implementation, the client application may be specifically the client application 100 shown in FIG. 3, the authentication server is the authentication server 310 in the roaming site 300, and the application server in the user home country/region of the client application may be specifically the application server 420 in the home site 400. The client application 100 uses a global unified version, and the address information that is of the application server of the client application 100 and that is initially configured in the client application 100 may be specifically, for example, www.example.com described above.

When the client application 100 logs in, the client application 100 accesses, based on the initially configured address, the nearest authentication server 310 in the roaming site 300 in which the client application 100 is located: sends, to the authentication server 310, the address information, information for obtaining the authorization code, and the application ID of the client application 100 that are jointly used as the authorization request information; and sends the user home country/region identification information of the client application 100 to the authentication server 310. In other words, the client application 100 sends the login request to the authentication server 310. The authentication server 310 receives the login request from the client application 100, completes login authentication on the client application 100 by using the authorization request information in the login request, and generates the authorization information based on the authorization request information. The authentication server 310 may determine, based on the user home country/region identification information of the client application 100 in the login request, that the application server in the user home country/region of the client application 100 is the application server 420. The authentication server 310 generates the access information of the application server 200 in the user home country/region of the client application 100, and sends the authorization information and the access information to the client application 100. After receiving the access information, the client application 100 can accurately access the application server 420 in the user home country/region of the client application 100 based on the access information, to satisfy a privacy compliance requirement, thereby effectively improving user privacy security. In addition, the client application 100 sends the authorization information to the application server 420, so that the application server 420 may complete authentication on the client application 100 based on the authorization information.

It should be noted that the authentication server 310 may specifically generate and send the access information after completing authentication on the client application 100. If the authentication fails, the authentication server 310 may not generate the access information.

Further, the authentication server 310 performs authentication on the client application 100. The authentication server 310 may specifically perform authentication by using the authorization information, for example, determine, based on the application ID of the client application in the authorization request information, whether the client application is an authorized application (for example, determine whether the client application is a locally registered application). If the client application is an authorized application, the authentication succeeds; otherwise, the authentication fails.

For example, the authentication server 310 determines the user home country/region of the client application 100 based on the user home country/region identification information, determines address information of the application server 420 in the user home country/region of the client application 100 based on a locally configured correspondence between a home country/region and an application server address, and generates the access information including the address information of the application server 420. Specifically, the correspondence between a home country/region and an application server address may be preconfigured on the authentication server 310. Specifically, the correspondence may be configured in a form of a correspondence table (for example, an application server address corresponding to Singapore and Thailand is https://as.example.com/cb, and an application server address corresponding to the United Kingdom and Germany is https://eu.example.com/cb). The user home country/region of the client application 100 may be determined based on the user home country/region identification information (for example, based on the user home country/region identification information, if it is determined that a user is a Thai user, the home country/region of the client application 100 is Thailand). An address of the application server 420 in the user home country/region of the client application 100 (which is specifically https://as.example.com/cb) can be accurately determined based on the correspondence that is between a home country/region and an application server address and that is locally configured on the authentication server, and the address (https://as.example.com/cb) is sent to the client application 100 by using the access information, so that the client application 100 can accurately access the application server 420 in the user home country/region of the client application 100 based on the address, to satisfy the privacy compliance requirement, thereby effectively improving the user privacy security.

For example, the authentication server 310 determines the user home country/region of the client application 100 based on the user home country/region identification information. The user home country/region identification information may be specifically account information of a user, for example, a user name of the user. The authentication server 310 may determine, based on the user name, the user home country/region (or a registration country/region) corresponding to the user name. Alternatively, the user home country/region identification information may be a distribution channel of the client application, terminal information of the client terminal in which the client application is located, or the like. The authentication server 310 determines a place of origin of the client application based on the distribution channel of the client application, and uses the place of origin as the user home country/region of the client application. Alternatively, the authentication server 310 determines a place of production of the client terminal as the user home country/region of the client application based on the terminal information of the client terminal in which the client application is located.

It should be noted that an application developer may specifically configure the correspondence between a home country/region and an application server address on the authentication server by using a developer management platform or an application configuration platform. During configuration, the application developer specifically needs to configure the correspondence on authentication servers in various regions towards which the client application 100 is oriented. In this way, the client application 100 can obtain the address of the application server in the user home country/region of the client application 100 by accessing any application server.

For example, in a possible implementation of this implementation, the address information of the application server 420 is configured by using a callback address parameter. The address information can be sent conveniently by returning the address information by using the callback address parameter. The callback address parameter may be specifically edirect_uri=https://as.example.com/cb.

In another possible implementation of this implementation, the address information of the application server 420 may be configured by defining another parameter.

In another possible implementation of this implementation, the access information may include only the address information, and certainly may also include other information used for accessing the application server, depending on a requirement.

For example, in another possible implementation of this implementation, the access information and the authorization information are combined into information for feeding back the login request, and then the information for feeding back the login request is sent. In this way, the access information and the authorization information can be sent by sending only one piece of information, thereby effectively improving communication efficiency. Alternatively, depending on a requirement, the access information and the authorization information may be sent by using two pieces of information.

According to the application login method provided in this implementation, the authentication server 310 may determine the user home country/region based on user identification information of the client application 100, and then send the address information that is of the application server 420 of the client application 100 and that is corresponding to the home country/region to the client application 100, so that the client application 100 can accurately access, based on the address information, the application server 420 that the client application 100 needs to access, thereby complying with the privacy compliance requirement.

An embodiment provides an authentication server. The authentication server enables a client application to accurately access an application server that the client application needs to access to satisfy a privacy compliance requirement, thereby complying with the privacy compliance requirement.

Figure 6:
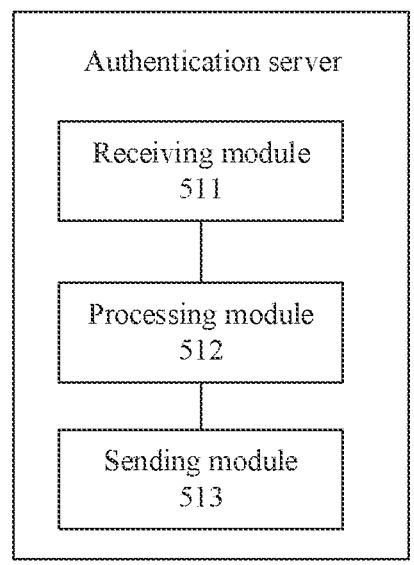
FIG. 6 is a schematic diagram of a structure of an authentication server according to some embodiments of this application.

FIG. 6 is a schematic diagram of a structure of an authentication server according to an implementation of this application. The authentication server includes a receiving module 511, a processing module 512, and a sending module 513.

In an implementation of this application, the receiving module 511 is configured to receive a login request from a client application, where the login request includes authorization request information of the client application and user home country/region identification information of the client application, and the authorization request information is used to obtain login authentication from the authentication server; the processing module 512 is configured to generate, based on the login request, authorization information used to respond to the authorization request information and access information, confirmed based on the user home country/region identification information, of an application server in a user home country/region of the client application; and the sending module 513 is configured to send the authorization information and the access information.

It should be noted that the application login method may be applied to the authentication server shown in FIG. 6, or may be applied to another authentication server that can implement the application login method.

An embodiment further provides a method for accessing an application server by an application, so that a client application can accurately access an application server that the client application needs to access, thereby complying with a privacy compliance requirement.

Figure 7:
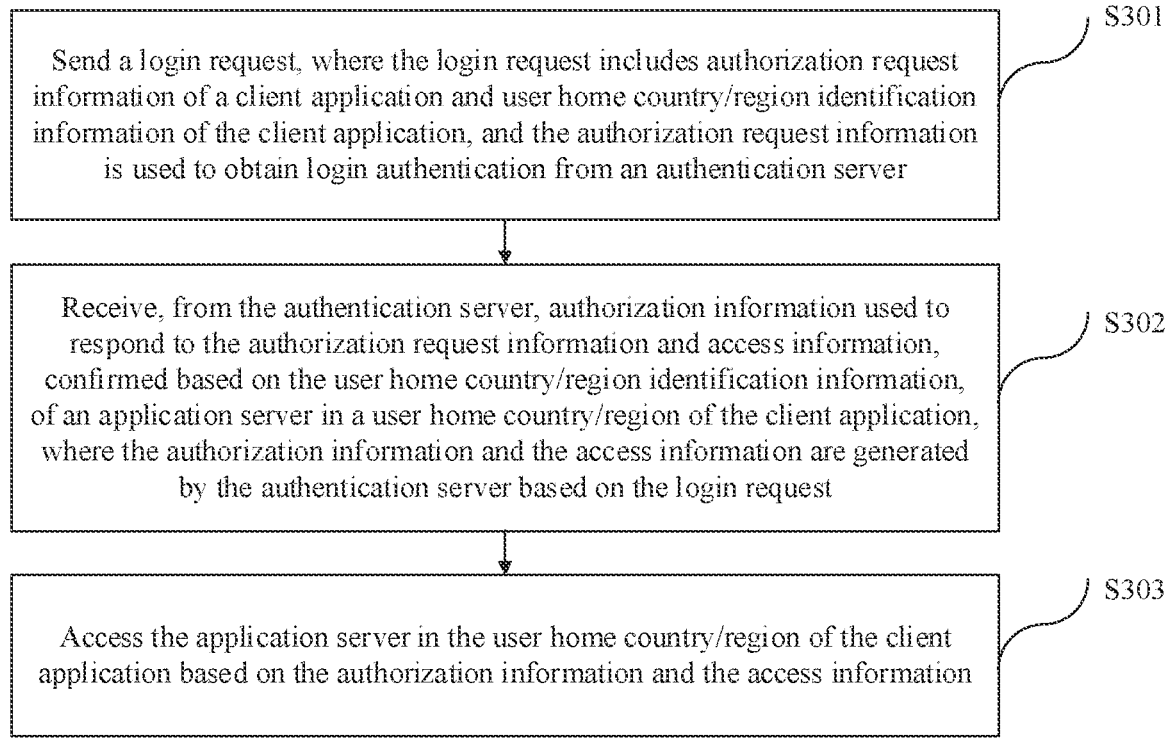
FIG. 7 is a method flowchart of a method for accessing an application server by an application according to some embodiments of this application.

FIG. 7 is a method flowchart of a method for accessing an application server by an application according to another implementation of this application. The method may be applied to a client terminal and specifically includes the following steps.

S301: Send a login request, where the login request includes authorization request information of a client application and user home country/region identification information of the client application, and the authorization request information is used to obtain login authentication from an authentication server.

S302: Receive, from the authentication server, authorization information used to respond to the authorization request information and access information, confirmed based on the user home country/region identification information, of an application server in a user home country/region of the client application, where the authorization information and the access information are generated by the authentication server based on the login request.

S303: Access the application server in the user home country/region of the client application based on the authorization information and the access information.

For example, in a possible implementation of this implementation, the authorization request information includes information for requesting to obtain an authorization code, initially configured address information of the application server of the client application, and an application ID of the client application.

For example, in a possible implementation of this implementation, the home country/region identification information is information that can identify the user home country/region of the client application 100. The user home country/region identification information includes at least one of account information of a user of the client application, a distribution channel of the client application, a source IP address requested by the client, and terminal information of the client terminal (including information such as a place of production/delivery of the device) in which the client application is located.

For example, in a possible implementation of this implementation, the authorization information includes the authorization code.

For example, in a possible implementation of this implementation, the authentication server is an authentication server in a region determined based on the initially configured address information of the application server of the client application, and the region in which the authentication server is located is inconsistent with the user home country/region.

In a possible implementation of this implementation, the client application may be specifically the client application 100 shown in FIG. 3, the authentication server is the authentication server 310, and the application server in the user home country/region of the client application may be specifically the application server 420. The client application 100 uses a global unified version, and the address information that is of the application server of the client application 100 and that is initially configured in the client application 100 may be specifically, for example, www.example.com described above.

When the client application 100 logs in, the client application 100 accesses, based on the initially configured address, the nearest authentication server 310 in the roaming site 300 in which the client application 100 is located; sends, to the authentication server 310, the address information, information for obtaining the authorization code, and the application ID of the client application 100 that are jointly used as the authorization request information; and sends the user home country/region identification information of the client application 100 to the authentication server 310. In other words, the client application 100 sends the login request to the authentication server 310. The authentication server 310 receives the login request from the client application 100, completes login authentication on the client application 100 by using the authorization request information in the login request, and generates the authorization information based on the authorization request information in the login request. The authentication server 310 may determine, based on the user home country/region identification information of the client application 100 in the login request, that the application server in the user home country/region of the client application 100 is the application server 420. The authentication server 310 generates the access information of the application server 200 in the user home country/region of the client application 100, and sends the authorization information and the access information to the client application 100. After receiving the access information and the authorization information, the client application 100 can accurately access the application server 420 in the user home country/region of the client application 100 based on the access information, to satisfy a privacy compliance requirement, thereby effectively improving user privacy security. In addition, the client application 100 sends the authorization information to the application server 420, so that the application server 420 may complete authentication on the client application 100 based on the authorization information.

For example, the authentication server 310 determines the user home country/region of the client application 100 based on the user home country/region identification information, determines address information of the application server 420 in the user home country/region of the client application 100 based on a locally configured correspondence between a home country/region and an application server address, and generates the access information including the address information of the application server 420. The correspondence between a home country/region and an application server address may be preconfigured on the authentication server 310. Specifically, the correspondence may be configured in a form of a correspondence table (for example, an application server address corresponding to Singapore and Thailand is https://as.example.com/cb, and an application server address corresponding to the United Kingdom and Germany is https://eu.example.com/cb). The user home country/region of the client application 100 may be determined based on the user home country/region identification information (for example, if a user is a Thai user, the home country/region of the client application 100 is Thailand). An address of the application server 420 in the user home country/region of the client application 100 (which is specifically https://as.example.com/cb) can be accurately determined based on the correspondence that is between a home country/region and an application server address and that is locally configured on the authentication server, and the address (https://as.example.com/cb) is sent to the client application 100 by using the access information, so that the client application 100 can accurately access the application server 420 in the user home country/region of the client application 100 based on the address, to satisfy the privacy compliance requirement, thereby effectively improving the user privacy security.

For example, in a possible implementation of this implementation, the address information of the application server 420 is configured by using a callback address parameter. The address information can be sent conveniently by returning the address information by using the callback address parameter. The callback address parameter may be specifically edirect_uri=https://as.example.com/cb.

In a possible implementation of this implementation, the address information of the application server 420 may be configured by defining another parameter.

In another possible implementation of this implementation, the access information may include only the address information, and certainly may also include other information used for accessing the application server, depending on a requirement.

For example, the access information and the authorization information are combined into information for feeding back the login request, and then the information for feeding back the login request is sent. In other words, the client application 100 receives only one piece of information, thereby effectively improving communication efficiency. Alternatively, depending on a requirement, the access information and the authorization information may be sent by using two pieces of information.

According to the method for accessing an application server by an application provided in this implementation, the authentication server 310 may determine the user home country/region based on user identification information of the client application 100, and then send the address information that is of the application server 420 of the client application 100 and that is corresponding to the home country/region to the client application 100, so that the client application 100 can accurately access the application server 420 based on the address information, thereby complying with the privacy compliance requirement.

An embodiment provides a client terminal. The client terminal enables a client application to accurately access an application server that the client application needs to access, thereby complying with a privacy compliance requirement.

Figure 8:
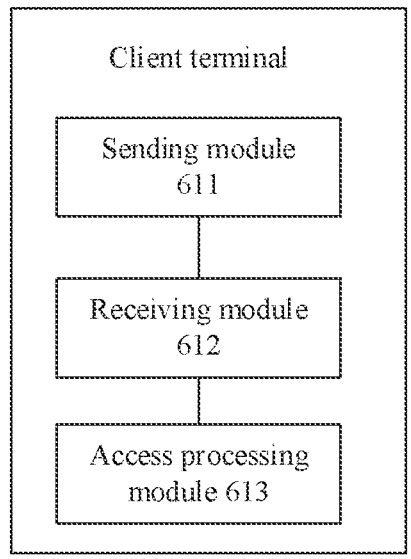
FIG. 8 is a schematic diagram of a structure of a client terminal according to some embodiments of this application.

FIG. 8 is a schematic diagram of a structure of a client terminal according to another implementation of this application. The client terminal includes a sending module 611, a receiving module 612, and an access processing module 613.

In a possible implementation of this implementation, the sending module 611 is configured to send a login request, where the login request includes authorization request information of a client application and user home country/region identification information of the client application, and the authorization request information is used to obtain login authentication from an authentication server; the receiving module 612 is configured to receive, from the authentication server, authorization information used to respond to the authorization request information and access information, confirmed based on the user home country/region identification information, of an application server in a user home country/region of the client application, where the authorization information and the access information are generated by the authentication server based on the login request; and the access processing module 613 is configured to access the application server in the user home country/region of the client application based on the authorization information and the access information.

It should be noted that the method for accessing an application server by an application may be applied to the client terminal shown in FIG. 8, or may be applied to another client terminal that can implement the method for accessing an application server by an application.

An implementation of this application further provides a communications system. For example, the communications system includes the foregoing authentication server and client terminal. In the communications system, the authentication server may determine a user home country/region based on user identification information of a client application, and then send address information that is of an application server of the client application and that is corresponding to the home country/region to the client terminal, so that the client application in the client terminal can accurately access the application server based on the address information, thereby complying with a privacy compliance requirement.

In addition, currently, more client applications support login and authorization operations of another client application. When another client application logs in by using account information provided by a client application, to satisfy a privacy compliance requirement, the another client application needs to access an application server that is in a user home country/region of the client application and that is used for access by the another application. However, the application server that the another client application needs to access cannot be accurately determined at present.

Figure 9:
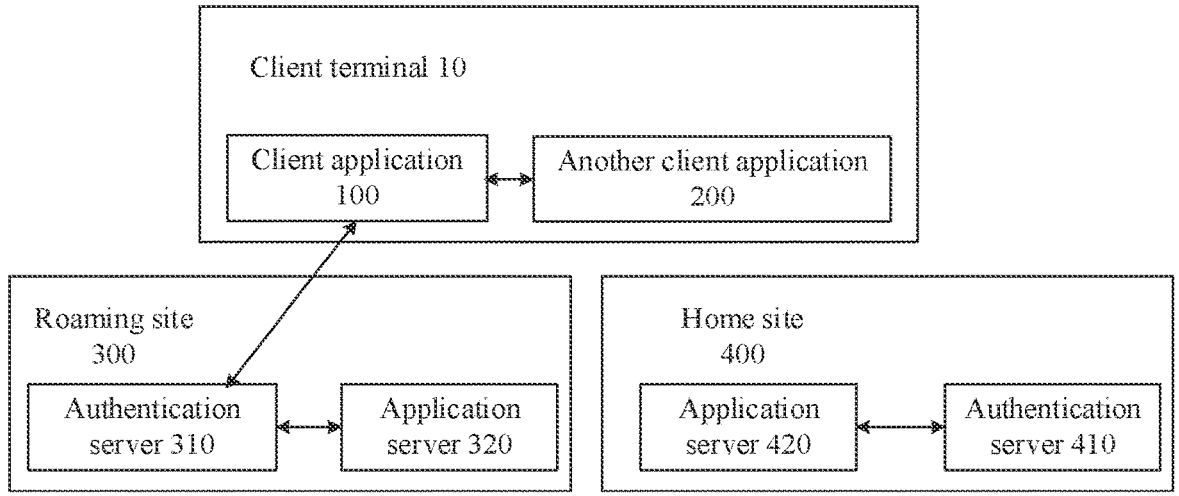
FIG. 9 is another scenario diagram of application login and accessing an application server by an application according to some embodiments of this application.

FIG. 9 is another scenario diagram of application login and accessing an application server by an application according to an implementation of this application. For example, in this scenario, a client application login and authentication system includes a client terminal 10 (a client application 100 and another client application 200 are disposed on the client terminal 10), a roaming site 300, and a home site 400. An authentication server 310 is deployed in the roaming site 300, and an application server 420 (the application server is an application server used for the another client application) is deployed in the home site 400. Further, an application server 320 (the application server is an application server used for the another client application) may be deployed in the roaming site 300, and an authentication server 410 may be deployed in the home site 400. The home site 400 is a region that actually needs to be accessed by the another client application 200 to comply with a privacy compliance requirement. The roaming site 300 is a region that is accessed by the another client application 200 during login and that is other than the region that actually needs to be accessed.

For example, the another client application 200 uses a global unified version, and a unified application server address is preset. When the another client application 200 performs single sign-on by using the client application 100, the another client application 200 sends an authorization request to the client application 100, where the authorization request includes information such as address information that is of an application server and that is preconfigured in the another client application 200. The client terminal 10 accesses the nearest authentication server 310 in the roaming site 300 based on the address, and sends the authorization request to the authentication server 310 for authentication. In this case, the authentication server 310 has only an address of the application server 320 in the region of the roaming site 300. Therefore, when the authentication server 310 needs to return the address of the application server to the another client application 200, the returned address is the address of the application server 320 in the roaming site 300, so that the another client application 200 cannot accurately access the application server 420 in the home site 400 to which the another client application 200 belongs. This causes a privacy compliance risk.

It should be noted that the client application 100 and the another client application 200 may be understood as two different client applications. Alternatively, for ease of understanding, the client application 100 may be understood as a first client application, and the another client application 200 may be understood as a second client application.

An embodiment further provides an application login method. The application login method enables another client application to accurately access an application server that the another client application needs to access to satisfy a privacy compliance requirement, thereby complying with the privacy compliance requirement.

Figure 10:
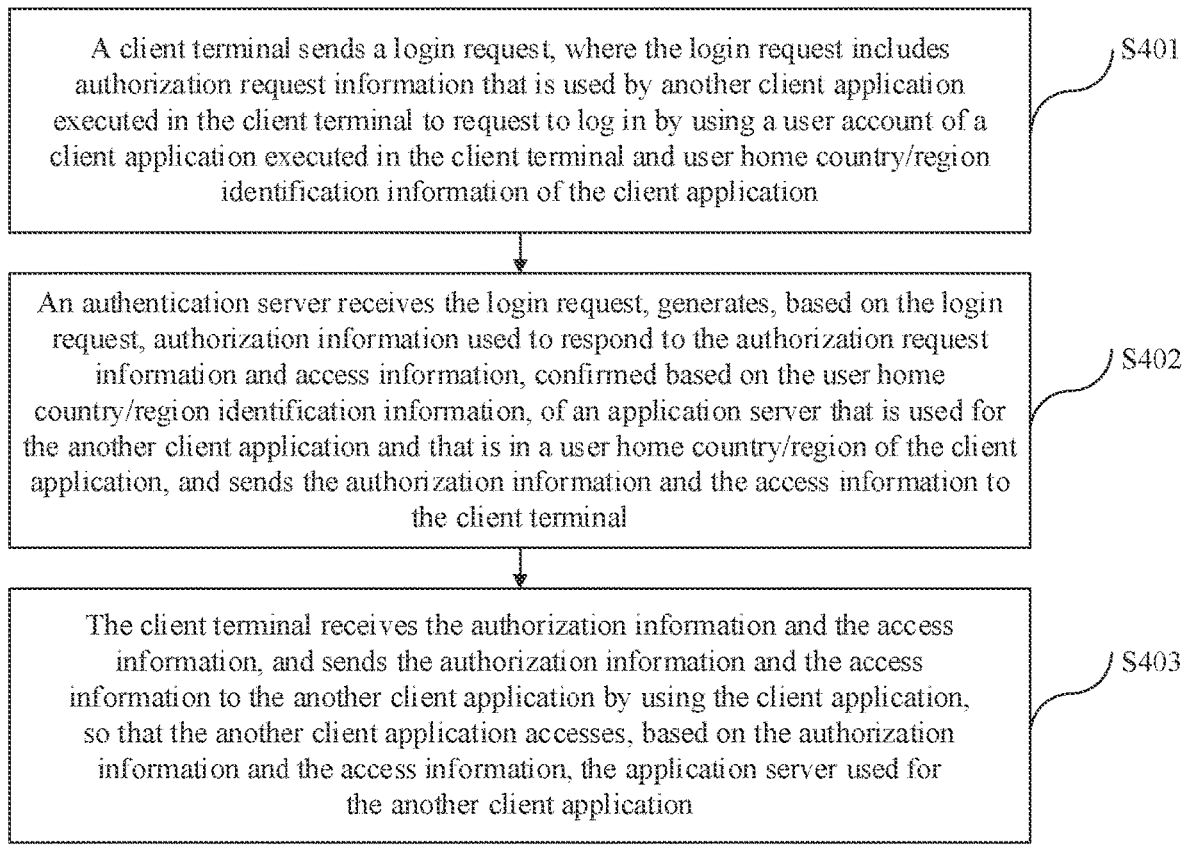
FIG. 10 is still another method flowchart of an application login method according to some embodiments of this application.

FIG. 10 is a method flowchart of an application login method according to an implementation of this application. The method specifically includes the following steps.

S401: A client terminal sends a login request, where the login request includes authorization request information that is used by another client application executed in the client terminal to request to log in by using a user account of a client application executed in the client terminal and user home country/region identification information of the client application.

S402: An authentication server receives the login request, generates, based on the login request, authorization information used to respond to the authorization request information and access information, confirmed based on the user home country/region identification information, of an application server that is used for the another client application and that is in a user home country/region of the client application, and sends the authorization information and the access information to the client terminal.

S403: The client terminal receives the authorization information and the access information, and sends the authorization information and the access information to the another client application by using the client application, so that the another client application accesses, based on the authorization information and the access information, the application server used for the another client application.

For example, the authorization request information includes information for requesting to obtain an authorization code, initially configured address information of the server of the another client application, and an application ID of the client application.

For example, in a possible implementation of this implementation, the home country/region identification information is information that can identify the user home country/region of the client application 100. The user home country/region identification information includes at least one of account information of a user of the client application, a distribution channel of the client application, a source IP address requested by the client, and terminal information of the client terminal (including information such as a place of production/delivery of the device) in which the client application is located.

For example, in a possible implementation of this implementation, the authorization information includes the authorization code.

For example, the authentication server is an authentication server in a region determined based on the initially configured address information of the application server of the another client application, and the region in which the authentication server is located is inconsistent with the user home country/region.

Specifically, in a possible implementation of this implementation, the client application may be specifically the client application 100, the another client application may be specifically the another client application 200, and the another client application 200 is located in a roaming region other than the home country/region of the another client application 200. In this case, the authentication server is the authentication server 310 (the authentication server 310 is an authentication server in the region in which the another client application 200 is located, that is, the authentication server in the roaming site 300), and the application server in the user home country/region of the another client application 200 may be specifically the application server 420. The another client application 200 uses a global unified version, and the address information that is of the application server of the another client application 200 and that is initially configured in the another client application 200 may be specifically, for example, www.example.com described above.

When the another client application 200 logs in, the another client application 200 sends a request to the client application 100, and sends, to the client application 100, the address information, information for obtaining the authorization code, and an application ID of the another client application 200 that are jointly used as the authorization request information. After the client application 100 receives the authorization request information, the client terminal 10 in which the client application 100 and the another client application 200 are located accesses, based on the initially configured address, the nearest authentication server 310 in the roaming site 300 in which the client application 100 is located, sends the authorization request information to the authentication server 310, and sends the user home country/region identification information of the client application 100 to the authentication server 310. It may also be understood that the client application 100 sends the login request to the authentication server 310. The authentication server 310 receives the login request from the client terminal 10 (the client application 100), completes login authentication on the another client application 200 by using the authorization request information in the login request, and generates the authorization information based on the authorization request information in the login request. The authentication server 310 may determine, based on the user home country/region identification information of the client application 100 in the login request, that the application server that is used for the another client application 200 and that is in the user home country/region of the client application 100 is the application server 420. The authentication server 310 generates the access information of the application server 200, and sends the authorization information and the access information to the client terminal 10 (the client application 100). The client terminal 10 (the client application 100) sends the authorization information and the access information to the another client application 200. After receiving the access information, the another client application 200 can accurately access, based on the access information, the application server 420 in the region that the another client application 200 needs to access, to satisfy a privacy compliance requirement, thereby effectively improving user privacy security. In addition, the another client application 200 sends the authorization information to the application server 420 by using the client terminal 10, so that the application server 420 may complete authentication on the another client application 200 based on the authorization information.

It should be noted that the authentication server 310 may specifically generate and send the access information after completing authentication on the another client application 200. If the authentication fails, the authentication server 310 may not generate the access information.

For example, the authentication server 310 determines the user home country/region of the client application 100 based on the user home country/region identification information, determines address information of the application server 420 in the user home country/region of the client application 100 based on a locally configured correspondence between a home country/region and an application server address, and generates the access information including the address information of the application server 420. The correspondence between a home country/region and an application server address may be preconfigured on the authentication server 310. Specifically, the correspondence may be configured in a form of a correspondence table (for example, an application server address corresponding to Singapore and Thailand is https://as.example.com/cb, and an application server address corresponding to the United Kingdom and Germany is https://eu.example.com/cb). The user home country/region of the client application 100 may be determined based on the user home country/region identification information (for example, if a user is a Thai user, the home country/region of the client application 100 is Thailand). An address of the application server 420 in the user home country/region of the client application 100 (which is specifically https://as.example.com/cb) can be accurately determined based on the correspondence that is between a home country/region and an application server address and that is locally configured on the authentication server, and the address (https://as.example.com/cb) is sent to the another client application 200 by using the access information, so that the another client application 200 can accurately access, based on the address, the application server 420 in the region that the another client application 200 needs to access, to satisfy the privacy compliance requirement, thereby effectively improving the user privacy security.

It should be noted that an application developer may specifically configure the correspondence between a home country/region and an application server address on the authentication server by using a developer management platform or an application configuration platform. During configuration, the application developer specifically needs to configure the correspondence on authentication servers in various regions towards which the another client application 200 is oriented. In this way, the client application 100 can obtain, by accessing any application server, the address of the application server in the region that the another client application 200 needs to access.

For example, in a possible implementation of this implementation, the address information of the application server 420 is configured by using a callback address parameter. The address information can be sent conveniently by returning the address information by using the callback address parameter. The callback address parameter may be specifically edirect_uri=https://as.example.com/cb.

In another implementation, the address information of the application server 420 may be configured by redefining a parameter.

In another possible implementation of this implementation, the address information of the application server 420 may be configured by defining another parameter.

In another possible implementation of this implementation, the access information may include only the address information, and certainly may also include other information used for accessing the application server, depending on a requirement.

For example, in another possible implementation of this implementation, the access information and the authorization information are combined into information for feeding back the login request, and then the information for feeding back the login request is sent. In this way, the access information and the authorization information can be sent by sending only one piece of information, thereby effectively improving communication efficiency. Alternatively, depending on a requirement, the access information and the authorization information may be sent by using two pieces of information.

According to the application login method provided in this implementation, when the another client application 200 accesses the nearest authentication server 310 in the region (the roaming site 300) in which the another client application 200 is located, the authentication server 310 may determine the user home country/region based on user identification information of the client application 100, and then send the address information that is of the application server 420 of the another client application 200 and that is corresponding to the home country/region to the another client application 200, so that the another client application 200 can accurately access the application server 420 based on the address information. In other words, even if the another client application 200 roams to a region other than the home country/region of the another client application 200 (that is, the client terminal 10 roams to a region other than the user home country/region), the another client application 200 can still accurately access the application server 420 in the home country/region of the another client application 200, thereby complying with the privacy compliance requirement.

It should be noted that, if the another client application 200 is located in the home country/region of the another client application 200, an authentication server accessed by the client terminal 10 for the first time is the authentication server in the home country/region of the another client application 200 (that is, may be the authentication server 410 in the home site 400). In addition, the another client application 200 may obtain the address information of the application server in the home country/region of the another client application 200 by using the authentication server, and access the application server in the home country/region of the another client application 200, to comply with a privacy compliance requirement.

Further, for example, in another possible implementation of this implementation, the another client application 200 uses one of a plurality of versions for the another client application that are provided for users in different regions. For example, the another client application 200 uses an Asia-Pacific version provided for Asia-Pacific users, and in this case, the address information that is of the application server of the another client application 200 and that is initially configured in the another client application 200 may be specifically, for example, as.example.com described above. When the another client application 200 logs in, the client terminal 10 in which the another client application 200 is located accesses an authentication server in the Asia-Pacific region based on the address information (namely, as.example.com) that is of the application server of the another client application 200 and that is initially configured in the another client application 200, and then the authentication server in the Asia-Pacific region returns the access information of the application server in the user home country/region of the client application 100 to the client terminal 10. Specifically, if a user is a user in the Asia-Pacific region, the authentication server in the Asia-Pacific region returns access information of an application server in the Asia-Pacific region; or if a user is a user in the European region, the authentication server in the Asia-Pacific region returns access information of an application server in the European region.

According to the application login method provided in this implementation, if the user installs, on the client terminal 10, another client application version inconsistent with the version for the user home country/region and the another client application 200 roams to another region, it can still be determined accurately that the application server in the user home country/region is used for access by the another client application 200. In this way, the another client application 200 can accurately access the application server that the another client application 200 needs to access to satisfy a privacy compliance requirement, thereby complying with the privacy compliance requirement.

It should be noted that, according to the application login method provided in this implementation, if the user installs another client application version consistent with the version for the user home country/region, likewise, it can still be determined accurately that the application server in the user home country/region is used for access by the another client application 200. In this way, the another client application 200 can accurately access the application server that the another client application 200 needs to access to satisfy a privacy compliance requirement, thereby complying with the privacy compliance requirement.

This application provides an application login method, which is applied to an authentication server, so that another client application can accurately access an application server that the another client application needs to access, thereby complying with a privacy compliance requirement.

Figure 11:
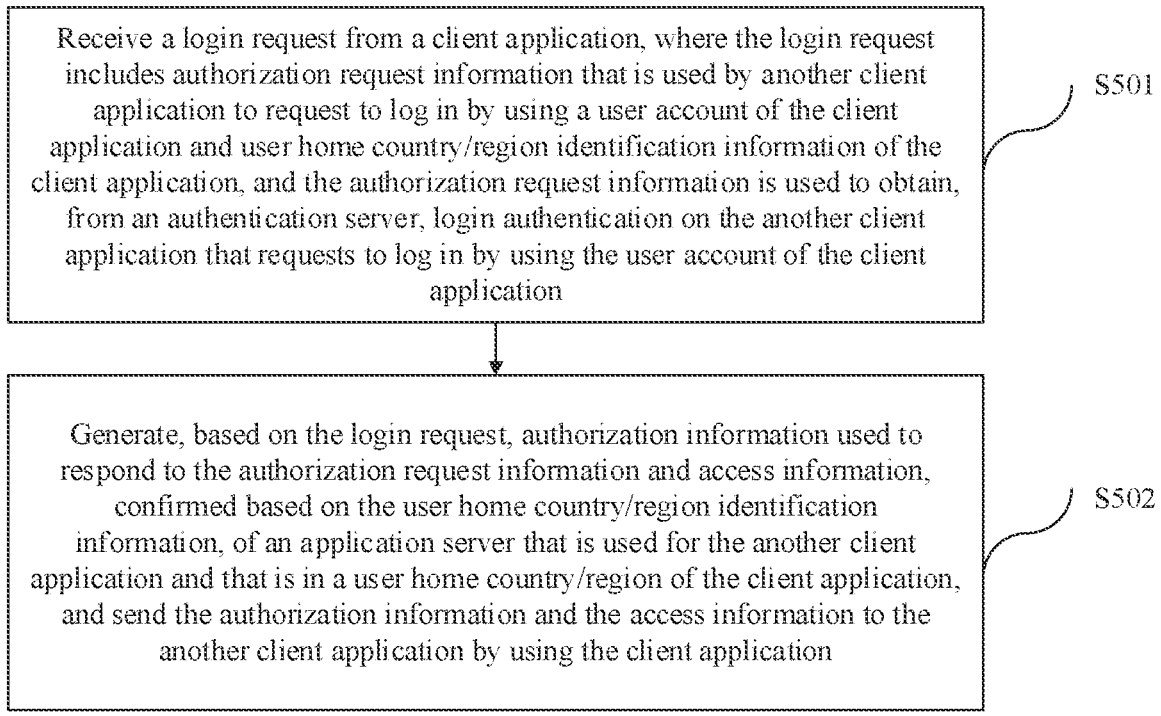
FIG. 11 is yet another method flowchart of an application login method according to some embodiments of this application.

FIG. 11 is a method flowchart of an application login method according to an implementation of this application. The method may be applied to an authentication server and specifically includes the following steps.

S501: Receive a login request from a client application, where the login request includes authorization request information that is used by another client application to request to log in by using a user account of the client application and user home country/region identification information of the client application, and the authorization request information is used to obtain, from the authentication server, login authentication on the another client application that requests to log in by using the user account of the client application.

S502: Generate, based on the login request, authorization information used to respond to the authorization request information and access information, confirmed based on the user home country/region identification information, of an application server that is used for the another client application and that is in a user home country/region of the client application, and send the authorization information and the access information to the another client application by using the client application.

For example, the authorization request information includes information for requesting to obtain an authorization code, initially configured address information of the server of the another client application, and an application ID of the client application.

For example, in a possible implementation of this implementation, the home country/region identification information is information that can identify the user home country/region of the client application 100. The user home country/region identification information includes at least one of account information of a user of the client application, a distribution channel of the client application, a source IP address requested by the client, and terminal information of a client terminal (including information such as a place of production/delivery of the device) in which the client application is located.

For example, in a possible implementation of this implementation, the authorization information includes the authorization code.

For example, the authentication server is an authentication server in a region determined based on the initially configured address information of the application server of the another client application, and the region in which the authentication server is located is inconsistent with the user home country/region.

Specifically, in a possible implementation of this implementation, the client application may be specifically the client application 100, the another client application may be specifically the another client application 200, the authentication server is the authentication server 310, and the application server in the user home country/region of the client application may be specifically the application server 420. The client application 100 uses a global unified version, and the address information that is of the application server of the client application 100 and that is initially configured in the client application 100 may be specifically, for example, www.example.com described above.

When the another client application 200 logs in, the another client application 200 sends a request to the client application 100, and sends, to the client application 100, the address information, information for obtaining the authorization code, and an application ID of the another client application 200 that are jointly used as the authorization request information. After receiving the authorization request information, the client application 100 accesses, based on the initially configured address, the nearest authentication server 310 in the roaming site 300 in which the client application 100 is located, sends the authorization request information to the authentication server 310, and sends the user home country/region identification information of the client application 100 to the authentication server

310. In other words, the client application 100 sends the login request to the authentication server 310. The authentication server 310 receives the login request from the client application 100, completes login authentication on the another client application 200 by using the authorization request information in the login request, and generates the authorization information based on the authorization request information in the login request. The authentication server 310 may determine, based on the user home country/region identification information of the client application 100 in the login request, that the application server that is used for the another client application 200 and that is in the user home country/region of the client application 100 is the application server 420. The authentication server 310 generates the access information of the application server 200, and sends the authorization information and the access information to the client application 100. The client application 100 forwards the authorization information and the access information to the another client application 200. After receiving the access information, the another client application 200 can accurately access, based on the access information, the application server 420 in the region that the another client application 200 needs to access, to satisfy a privacy compliance requirement, thereby effectively improving user privacy security. In addition, the another client application 200 sends the authorization information to the application server 420, so that the application server 420 may complete authentication on the another client application 200 based on the authorization information.

It should be noted that the authentication server 310 may specifically generate and send the access information after completing authentication on the another client application 200. If the authentication fails, the authentication server 310 may not generate the access information.

For example, the authentication server 310 determines the user home country/region of the client application 100 based on the user home country/region identification information, determines address information of the application server 420 in the user home country/region of the client application 100 based on a locally configured correspondence between a home country/region and an application server address, and generates the access information including the address information of the application server 420. The correspondence between a home country/region and an application server address may be preconfigured on the authentication server 310. Specifically, the correspondence may be configured in a form of a correspondence table (for example, an application server address corresponding to Singapore and Thailand is https://as.example.com/cb, and an application server address corresponding to the United Kingdom and Germany is https://eu.example.com/cb). The user home country/region of the client application 100 may be determined based on the user home country/region identification information (for example, if a user is a Thai user, the home country/region of the client application 100 is Thailand). An address of the application server 420 in the user home country/region of the client application 100 (which is specifically https://as.example.com/cb) can be accurately determined based on the correspondence that is between a home country/region and an application server address and that is locally configured on the authentication server, and the address (https://as.example.com/cb) is sent to the another client application 200 by using the access information, so that the another client application 200 can accurately access, based on the address, the application server 420 in the region that the another client application 200 needs to access, to satisfy the privacy compliance requirement, thereby effectively improving the user privacy security.

It should be noted that an application developer may specifically configure the correspondence between a home country/region and an application server address on the authentication server by using a developer management platform or an application configuration platform. During configuration, the application developer specifically needs to configure the correspondence on authentication servers in various regions towards which the another client application 200 is oriented. In this way, the client application 100 can obtain, by accessing any application server, the address of the application server in the region that the another client application 200 needs to access.

For example, in a possible implementation of this implementation, the address information of the application server 420 is configured by using a callback address parameter. The address information can be sent conveniently by returning the address information by using the callback address parameter. The callback address parameter may be specifically edirect_uri=https://as.example.com/cb.

In another implementation, the address information of the application server 420 may be configured by redefining a parameter.

In another possible implementation of this implementation, the address information of the application server 420 may be configured by defining another parameter.

In another possible implementation of this implementation, the access information may include only the address information, and certainly may also include other information used for accessing the application server, depending on a requirement.

For example, in another possible implementation of this implementation, the access information and the authorization information are combined into information for feeding back the login request, and then the information for feeding back the login request is sent. In this way, the access information and the authorization information can be sent by sending only one piece of information, thereby effectively improving communication efficiency. Alternatively, depending on a requirement, the access information and the authorization information may be sent by using two pieces of information.

According to the application login method provided in this implementation, the authentication server 310 may determine the user home country/region based on user identification information of the client application 100, and then send the address information that is of the application server 420 of the another client application 200 and that is corresponding to the home country/region to the another client application 200, so that the another client application 200 can accurately access the application server 420 based on the address information, thereby complying with the privacy compliance requirement.

An embodiment provides an authentication server. The authentication server enables another client application to accurately access an application server that the another client application needs to access, thereby complying with a privacy compliance requirement.

Figure 12:
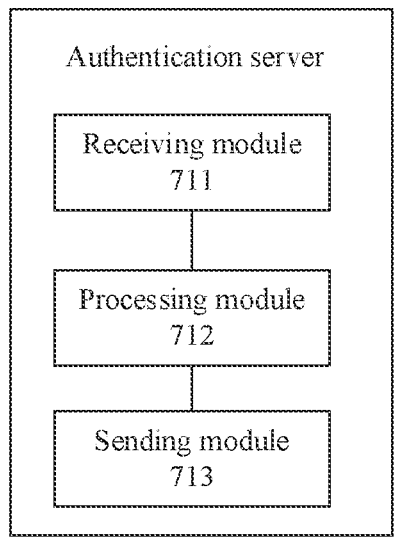
FIG. 12 is another schematic diagram of a structure of an authentication server according to some embodiments of this application.

FIG. 12 is a schematic diagram of a structure of an authentication server according to an implementation of this application. The authentication server includes a receiving module 711, a processing module 712, and a sending module 713.

In an implementation of this application, the receiving module 711 is configured to receive a login request from a client application, where the login request includes authorization request information that is used by another client application to request to log in by using a user account of the client application and user home country/region identification information of the client application, and the authorization request information is used to obtain, from the authentication server, login authentication on the another client application that requests to log in by using the user account of the client application; the processing module 712 is configured to generate, based on the login request, authorization information used to respond to the authorization request information and access information, confirmed based on the user home country/region identification information, of an application server that is used for the another client application and that is in a user home country/region of the client application: and the sending module 713 is configured to send the authorization information and the access information to the another client application by using the client application.

It should be noted that the application login method may be applied to the authentication server shown in FIG. 12, or may be applied to another authentication server that can implement the application login method.

An embodiment further provides a method for accessing an application server by an application, so that another client application can accurately access an application server that the another client application needs to access, thereby complying with a privacy compliance requirement.

Figure 13:
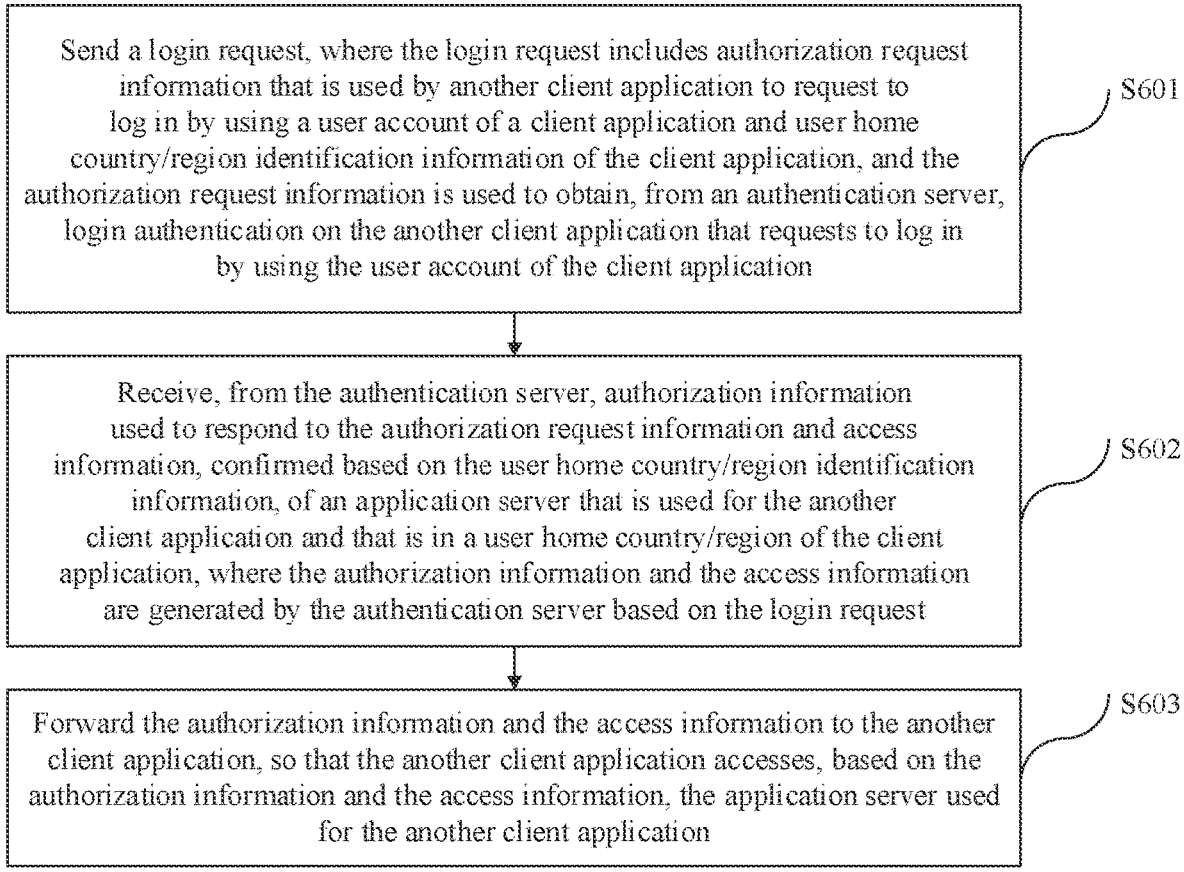
FIG. 13 is another method flowchart of a method for accessing an application server by an application according to some embodiments of this application.

FIG. 13 is a method flowchart of a method for accessing an application server by an application according to another implementation of this application. The method may be applied to a client terminal and specifically includes the following steps.

S601: Send a login request, where the login request includes authorization request information that is used by another client application to request to log in by using a user account of a client application and user home country/region identification information of the client application, and the authorization request information is used to obtain, from an authentication server, login authentication on the another client application that requests to log in by using the user account of the client application.

S602: Receive, from the authentication server, authorization information used to respond to the authorization request information and access information, confirmed based on the user home country/region identification information, of an application server that is used for the another client application and that is in a user home country/region of the client application, where the authorization information and the access information are generated by the authentication server based on the login request.

S603: Forward the authorization information and the access information to the another client application, so that the another client application accesses, based on the authorization information and the access information, the application server used for the another client application.

For example, in a possible implementation of this implementation, the authorization request information includes information for requesting to obtain an authorization code, initially configured address information of the server of the another client application, and an application ID of the client application.

For example, in a possible implementation of this implementation, the home country/region identification information is information that can identify the user home country/region of the client application 100. The user home country/region identification information includes at least one of account information of a user of the client application, a distribution channel of the client application, a source IP address requested by the client, and terminal information of the client terminal (including information such as a place of production/delivery of the device) in which the client application is located.

For example, in a possible implementation of this implementation, the authorization information includes the authorization code.

For example, the authentication server is an authentication server in a region determined based on the initially configured address information of the application server of the another client application, and the region in which the authentication server is located is inconsistent with the user home country/region.

In a possible implementation of this implementation, the client application may be specifically the client application 100, the another client application may be specifically the another client application 200, the authentication server is the authentication server 310, and the application server in the user home country/region of the client application may be specifically the application server 420. The client application 100 uses a global unified version, and the address information that is of the application server of the client application 100 and that is initially configured in the client application 100 may be specifically, for example, www.example.com described above.

When the another client application 200 logs in, the another client application 200 sends a request to the client application 100, and sends, to the client application 100, the address information, information for obtaining the authorization code, and an application ID of the another client application 200 that are jointly used as the authorization request information. After receiving the authorization request information, the client application 100 accesses, based on the initially configured address, the nearest authentication server 310 in the roaming site 300 in which the client application 100 is located, sends the authorization request information to the authentication server 310, and sends the user home country/region identification information of the client application 100 to the authentication server 310. In other words, the client application 100 sends the login request to the authentication server 310. The authentication server 310 receives the login request from the client application 100, completes login authentication on the another client application 200 by using the authorization request information in the login request, and may determine, based on the user home country/region identification information of the client application 100 in the login request, that the application server that is used for the another client application 200 and that is in the user home country/region of the client application 100 is the application server 420. The authentication server 310 generates the access information of the application server 200, generates the authorization information based on the authorization request information in the login request, and sends the authorization information and the access information to the client application 10. The client application 100 forwards the authorization information and the access information to the another client application 200. After receiving the access information, the another client application 200 can accurately access, based on the access information, the application server 420 that the another client application 200 needs to access to satisfy a privacy compliance requirement, to satisfy the privacy compliance requirement, thereby effectively improving user privacy security.

For example, the authentication server 310 determines the user home country/region of the client application 100 based on the user home country/region identification information, determines address information of the application server 420 in the user home country/region of the client application 100 based on a locally configured correspondence between a home country/region and an application server address, and generates the access information including the address information of the application server 420. The correspondence between a home country/region and an application server address may be preconfigured on the authentication server 310. Specifically, the correspondence may be configured in a form of a correspondence table (for example, an application server address corresponding to Singapore and Thailand is https://as.example.com/cb, and an application server address corresponding to the United Kingdom and Germany is https://eu.example.com/cb). The user home country/region of the client application 100 may be determined based on the user home country/region identification information. An address of the application server 420 in the user home country/region of the client application 100 can be accurately determined based on the correspondence that is between a home country/region and an application server address and that is locally configured on the authentication server, and the address is sent to the another client application 200 by using the access information, so that the another client application 200 can accurately access, based on the address, the application server 420 in the region that the another client application 200 needs to access, to satisfy the privacy compliance requirement, thereby effectively improving the user privacy security.

For example, in a possible implementation of this implementation, the address information of the application server 420 is configured by using a callback address parameter. The address information can be fed back conveniently by returning the address information by using the callback address parameter. The callback address parameter may be specifically edirect_uri=https://as.example.com/cb.

In a possible implementation of this implementation, the address information of the application server 420 may be configured by redefining a parameter.

For example, the access information and the authorization information are combined into information for feeding back the login request, and then the information for feeding back the login request is sent. In other words, the another client application 200 receives only one piece of information, thereby effectively improving communication efficiency. Alternatively, depending on a requirement, the access information and the authorization information may be sent by using two pieces of information.

According to the method for accessing an application server by an application provided in this implementation, the authentication server 310 may determine the user home country/region based on user identification information of the client application 100, and then send the address information that is of the application server 420 of the another client application 200 and that is corresponding to the home country/region to the another client application 200, so that the another client application 200 can accurately access the application server 420 based on the address information, thereby complying with the privacy compliance requirement.

An embodiment provides a client terminal. The client terminal enables another client application to accurately access an application server that the another client application needs to access, thereby complying with a privacy compliance requirement.

Figure 14:
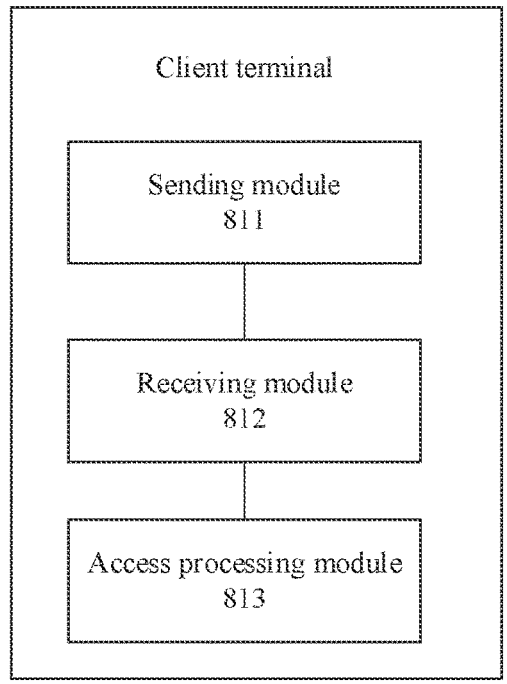
FIG. 14 is another schematic diagram of a structure of a client terminal according to some embodiments of this application.

FIG. 14 is a schematic diagram of a structure of a client terminal according to another implementation of this application. The client terminal includes a sending module 811, a receiving module 812, and an access processing module 813.

In a possible implementation of this implementation, a sending module 610 is configured to send a login request, where the login request includes authorization request information that is used by another client application to request to log in by using a user account of a client application and user home country/region identification information of the client application, and the authorization request information is used to obtain, from an authentication server, login authentication on the another client application that requests to log in by using the user account of the client application, a receiving module 620 is configured to receive, from the authentication server, authorization information used to respond to the authorization request information and access information, confirmed based on the user home country/region identification information, of an application server that is used for the another client application and that is in a user home country/region of the client application, where the authorization information and the access information are generated by the authentication server based on the login request: and an access processing module 630 is configured to forward the authorization information and the access information to the another client application, so that the another client application accesses, based on the authorization information and the access information, the application server used for the another client application.

It should be noted that the method for accessing an application server by an application may be applied to the client terminal shown in FIG. 14, or may be applied to another client terminal that can implement the method for accessing an application server by an application.

Another implementation of this application further provides a communications system, including the foregoing authentication server and client terminal. In the communications system, the authentication server may determine a user home country/region based on user identification information of a client application, and then send address information that is of an application server of another client application and that is corresponding to the user home country/region to the another client application, so that the client application can accurately access the application server based on the address information, thereby complying with a privacy compliance requirement.

In a scenario in which the another client application logs in by using account information provided by the client application, the OAuth 2.0 standard may be specifically used to implement single sign-on by using an account system of the client application. In the system of the client application, a user of the client application has a definite home country/region, and the another client application needs to access the application server in the user home country/region according to a privacy compliance requirement. However, in an existing authorization code login mode in a standard procedure of OAuth 2.0, the another client application needs to report an authorization code obtained from the client application to the application server that is used for the another client application to access and that is in the user home country/region of the client application, and the user home country/ region cannot be obtained m this case. As a result, an application server in a specific region that needs to be accessed cannot be known.

Figure 15:
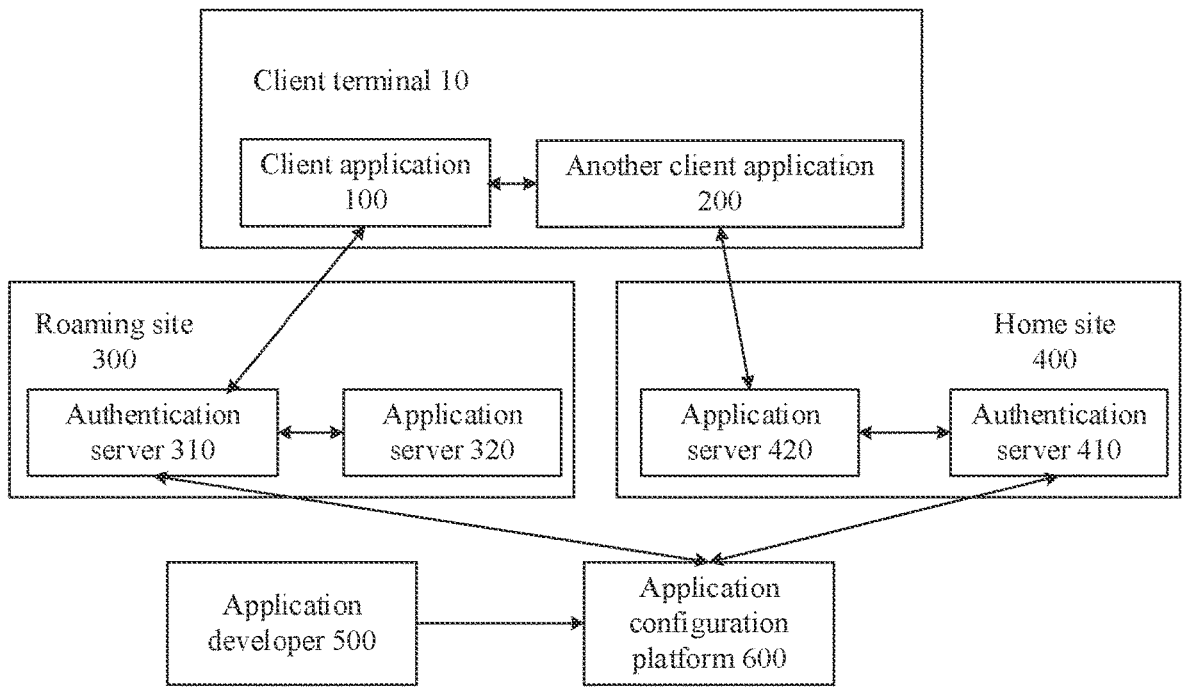
FIG. 15 is still another scenario diagram of application login and accessing an application server according to some embodiments of this application.

FIG. 15 is a scenario diagram of application login and accessing an application server according to an implementation of this embodiment. The scenario is specifically a scenario in which single sign-on is implemented by using the OAuth 2.0 standard. A client terminal 10, a roaming site 300, a home site 400, an application developer 500, and an application configuration platform 600 are included in this scenario, where a client application 100 (which is a client application that provides OAuth 2.0 standard-based login) and another client application 200 are configured on the client terminal 10. An authentication server 310 (which provides OAuth 2.0 standard-based authentication) and an application server 320 (which is specifically an application server corresponding to the another client application 200) are deployed in the roaming site 300. An authentication server 410 (which provides OAuth 2.0 standard-based authentication) and an application server 420 (which is specifically an application server corresponding to the another client application 200) are deployed in the home site 400. The application developer 500 registers, on the application configuration platform 600, an application including the another client application 200, and configures, on the application configuration platform 500, a correspondence (a mapping relationship) including a home country/region and a home country/region application server address. Then, the application configuration platform 600 configures the correspondence between a home country/region and an application server on various authentication servers in regions towards which the application configuration platform 600 is oriented, for example, the authentication server 310 and the authentication server 410. The home site 400 is a region that actually needs to be accessed by the another client application 20M to comply with a privacy compliance requirement. The roaming site 300 is a region that is accessed by the another client application 200 during login and that is other than the region that actually needs to be accessed.

Specifically, in this implementation, when configuring login performed by using OAuth 2.0, the application developer 500 configures the correspondence between a home country/region and an application server address on the authentication server 310 and the authentication server 410 by configuring a routing table. Specifically, the application developer 500 additionally configures a route configuration parameter for returning a server address. The route configuration parameter is the correspondence between a home country/region and an application server address. The route configuration parameter includes two parts: a routing condition and an application server address. The routing condition may be specifically a user home country/region. In an OAuth 2.0 interaction process, the application server address is returned to the another client application 200 according to a rule of the route configuration parameter, where the application server address may be a domain name of an application server.

Further, in this implementation, access information may be specifically a redirect_uri parameter, and authorization information is specifically an authorization code.

In a possible implementation of this implementation, the OAuth 2.0 standard is extended, one redirect_uri parameter defined in the standard is extended to a plurality of redirect_uri parameters that can be configured, and country/region lists corresponding to different redirect_uri are specified. When the another client application logs in by using OAuth 2.0, and the authentication server returns the authorization code, the authentication server calls back corresponding redirect_uri to the another client application 200 based on country/region information of a login user. The another client application 200 uses redirect_uri as an address for accessing the application server 420 in the home site 400.

Figure 16:
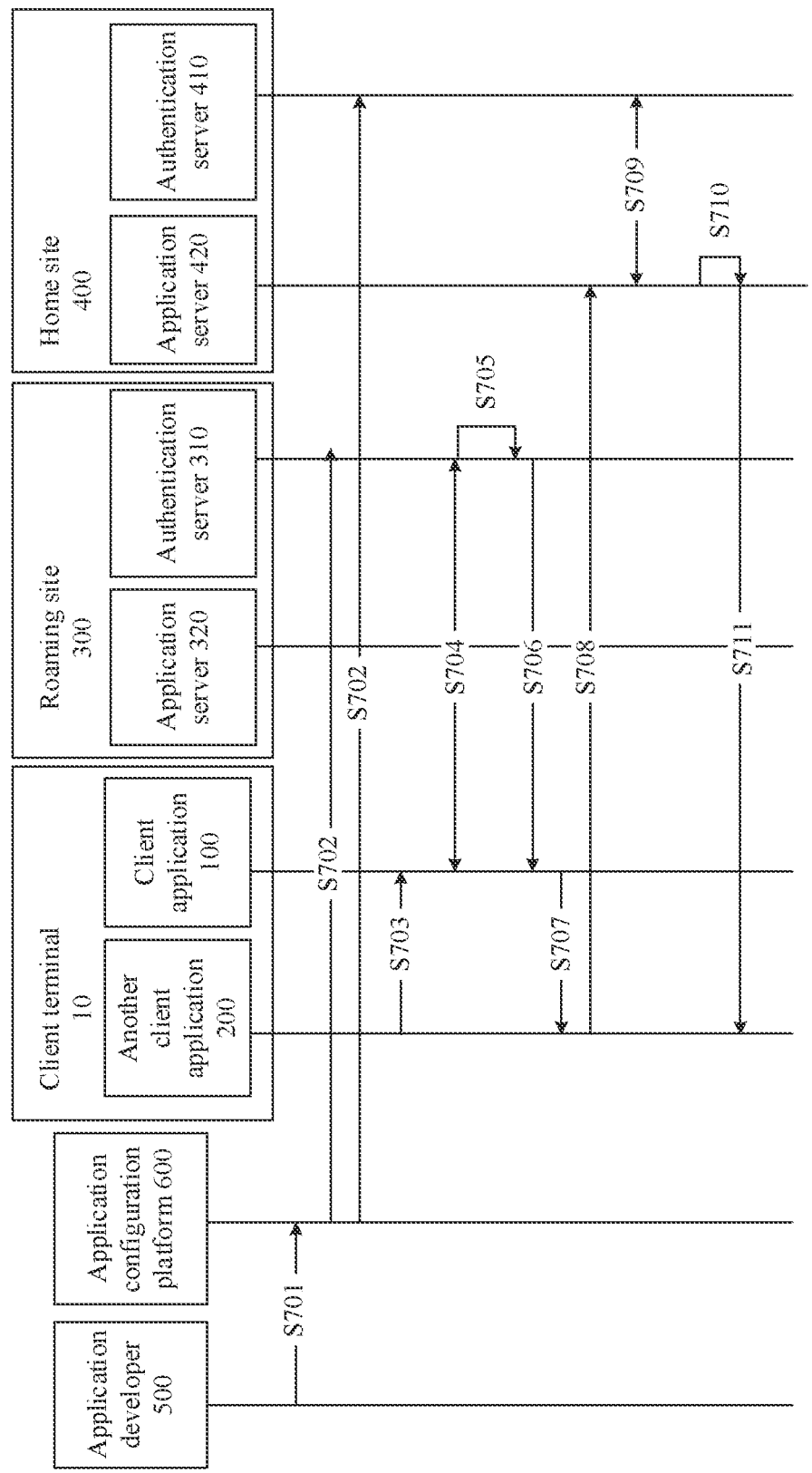
FIG. 16 is a sequence diagram of an application login method and a method for accessing an application server according to some embodiments of this application.

FIG. 16 is a sequence diagram of an application login method and a method for accessing an application server according to an implementation of this application. The method specifically includes the following steps.

S701: An application developer 500 registers another client application 200 on an application configuration platform 600, and configures a correspondence between a routing condition and an application server address on the application configuration platform 600.

Specifically, during configuration of redirect_uri, a plurality of redirect_uri may be configured and which redirect_uri is used under a specific condition is specified. For example, a home country/region of an account of an authorized user (a user of a client application 100) is used as the routing condition. The following uses a json format as an example to describe a format of the routing table:

---

"routelist":[{"redirect_uri":"https://as.example.com/cb".
"countries":["SG","TH","IN","MY"]), ("redirect_uri":"https://eu example.com/cb",
"countries":["GB","DE","GR","FR"]})

---

If the home country of the account is Singapore (SG), Thailand (TH), India (IN), or Malaysia (MY), corresponding redirect_uri is https://as.example.com/cb. If the home country/region of the account is the United Kingdom (GB), Germany (DE), Greece (GR), or France (FR), corresponding redirect_uri is https://eu.example.com/cb.

Further, when accessing the open application configuration platform (an authorization platform) by using the OAuth 2.0 standard, in addition to configuring a callback address (redirect_uri) on the application configuration platform, the application developer further needs to configure other application access information such as an application name, an application icon, an authorization scope of an application, and a certificate fingerprint of an application (a mobile APP). This can be specifically set depending on a requirement.

S702: The application configuration platform 600 delivers the correspondence between a routing condition and an application server address to authentication servers (which are specifically, for example, OAuth servers) in different sites, and may specifically deliver the correspondence to an authentication server 310 and an authentication server 320 in this implementation.

S703: The another client application 200 sends an authorization request to the client application 100.

Specifically, the another client application 200 sends authorization request information including information about the authorization request for obtaining an authorization code, initially configured address information of an application server of the another client application, and an application ID of the another client application to the client application 100.

The authorization request may be specifically an HTTP (Hypertext Transfer Protocol, Hypertext Transfer Protocol) request. Specifically, a format of the HTTP request is as follows:

```
GET
/authorize?response_type=code&client_id=s6BhdRkqt3&state=
xyz&redirect_uri=https://as.example.com/cb HTTP/.1
    Host: server, example.com
```

The information about the authorization request for obtaining the authorization code is specifically response_type=code, the initially configured address information of the application server of the another client application is redirect_uri=https://as.example.com/cb, and the application ID of the another client application is client_id=s6BhdRkqt3.

Further, the authorization request information may be specifically a corresponding authorization SDK (Software Development Kit, software development kit) sent to the client application 100.

- S704: After receiving the authorization request, the client application 100 accesses the authentication server 310 based on the authorization request. Specifically, the client application 100 generates a login request including the authorization request information and user account information of the client application 100, and sends the login request to the authentication server 310. The login request may also be specifically an HTTP request.
- S705: The authentication server 310 receives the login request, completes authentication based on the authorization request, generates the code, and determines, based the user account information, a callback address parameter corresponding to an address of an application server in a region that the another client application 200 needs to access.

Specifically, during authorization execution, if the home country/region of the currently authorized user account is the United Kingdom (GB), when returning the code to a caller, the authorization server returns the corresponding configured redirect_uri, that is, https://eu.example.com/cb, to the caller.

- S706: The authentication server 310 sends the code and the callback address parameter to the client application 100.

Specifically, the code and the callback address parameter may be sent by using an HTTP response message. A specific format of the HTTP response message is as follows:
HTTP/1.1302Found
Location:
https://eu.example.com/
    cb?code=SplxlOBeZQQYbYS6WxSbIA&state=xyz
Specifically, the callback address parameter information is https://eu.example.com/cb, and the code information is code=SplxlOBeZQQYbYS6WxSbIA.

- S707: The client application 100 sends the code and the callback address parameter to the another client application 200.
- S708: The another client application 200 accesses, by using the callback address parameter, an application server 420 corresponding to the another client application 200, and sends the code to the application server 420.

Specifically, when obtaining redirect_uri and the code of the home country/region, the another client application 200 reports the code to the server of the another client application 200 by using a domain name of redirect_uri as a destination address. The code may be specifically sent by using the following HTTP message:
POST   /login?code=SplxlOBeZQQYbYS6WxSbIA HTTP/1.1
Host: eu.example.com

- S709. The application server 420 sends the code to an authentication server 410 for authentication, and requests to obtain RT and AT information. After completing the authentication, the authentication server 410 returns the RT and AT information to the application server 420.

The authentication server 410 locally completes authentication on the code based on the received code to complete authentication on the another client application 200, and returns the RT and AT information after the authentication succeeds.

In the request for obtaining the RT and AT, redirect_uri used when the authorization code is returned needs to be filled. In this case, HTTP information may be specifically as follows:
POST /token HTTP/1.1
Host: server.example.com
Authorization:   Basic   czZCaGRSa3F0MzpnWDFmQmF0M2JW
Content-Type: application/x-www-form-urlencoded
grant_type=authorization_code&code=SplxlOBeZQQYb
    YS6WxSbIA&redirect_uri=https://eu.example.com/cb It should be noted that, when sending the code to the authentication server 410 for authentication, the application server 420 may further send information used for authentication, such as security information.

- S710: The application server 420 records the RT and AT information, and generates a service token.
- S711: The application server 420 sends the service token to the another client application 200, so that the another client application 200 performs a subsequent service processing operation by using the service token.

In this implementation, by extending the OAuth 2.0 protocol, defined redirect_uri is extended to a plurality of redirect_uri that can be configured, and a routing condition may be separately configured for each redirect_uri, to directly obtain an address for routing to an application server.

It should be noted that in another possible implementation of this implementation, the address information of the application server may be configured by defining another new parameter. For example, a parameter name is defined as a domain. When the authorization code is returned to the another client application 200, the domain parameter matching the routing condition is additionally returned. An example of HTTP response information for returning the authorization code is as follows:
HTTP/1.1 302 Found
Location:
https://client.example.com/
    cb?code=SplxlOBeZQQYbYS6WxSbIA&state=xyz&
    domain=https://eu.example.com/cb It should be noted that in processing of other steps, parameters related to an application server address in various pieces of HTTP information are different, all other parts in the pieces of HTTP information may be the same, or may be correspondingly adjusted based on the newly defined parameter. This may be specifically selected depending on a requirement, and details are not described herein.

In this implementation, in a scenario in which a service needs to be deployed at sites in a plurality of regions around the world, a correspondence between a physical region and an application server address may be deployed on authentication servers in the sites, to determine an accurate target application server address. Specifically, the OAuth 2.0 standard may be extended. During execution of an authorization code procedure of OAuth 2.0, when a code is returned, the target application server address is returned based on a routing condition, so that another client application can access, based on the address, an application server that satisfies a privacy compliance requirement, thereby resolving a routing problem of globalized multi-site deployment of APPs, and complying with a data protection compliance requirement in globalized deployment. In addition, in this implementation, on a premise that the OAuth 2.0 standard is extended so that an APP accurately accesses an application server of the APP, interaction components can be effectively reduced and an interaction process can be effectively simplified, thereby improving interaction performance.

Figure 17:
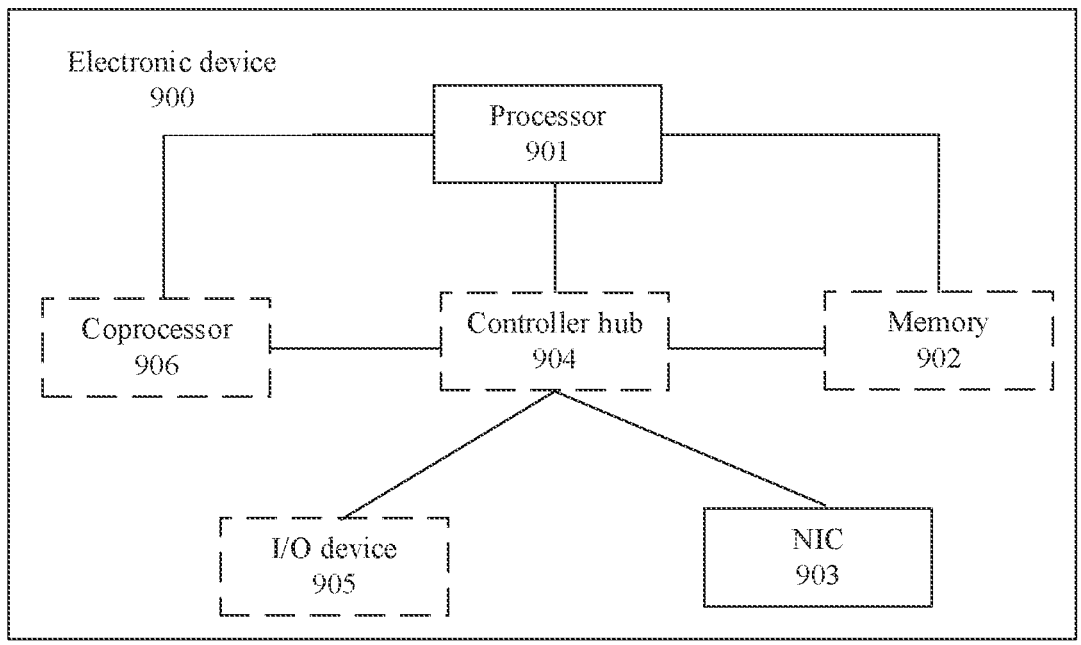
FIG. 17 is a schematic diagram of a structure of an electronic device according to some embodiments of this application.

FIG. 17 is a schematic diagram of a structure of an electronic device 900 according to an implementation of this application. The electronic device 900 may include one or more processors 901 coupled to a controller hub 904. In at least one embodiment, the controller hub 904 communicates with the processor 901 through a multi-branch bus such as a front side bus (FSB), a point-to-point interface such as a quick path interconnect (QPI), or a similar connection. The processor 901 executes instructions for controlling a general type of data processing operation. In an embodiment, the controller hub 904 includes, but is not limited to, a graphics memory controller hub (GMCH) (not shown in the figure) and an input/output hub (IOH) (which may be on separate chips) (not shown in the figure). The GMCH includes a memory and a graphics controller, and is coupled to the IOH.

The electronic device 900 may further include a coprocessor 906 and a memory 902 that are coupled to the controller hub 904. Alternatively, one or both of the memory 902 and the GMCH may be integrated into the processor 901 (as described in this application). The memory 902 and the coprocessor 906 are directly coupled to the processor 901 and the controller hub 904. The controller hub 904 and the IOH are located in a single chip.

The memory 902 may be, for example, a dynamic random access memory (DRAM), a phase change memory (PCM), or a combination thereof.

In an embodiment, the coprocessor 906 is a dedicated processor, for example, a high throughput MIC processor, a network or communications processor, a compression engine, a graphics processor, a GPGPU, or an embedded processor. An optional property of the coprocessor 906 is indicated by dashed lines in FIG. 17.

In an embodiment, the electronic device 900 may further include a network interface (NIC) 903. The network interface 903 may include a transceiver, configured to provide a radio interface for the electronic device 900 to further communicate with any other suitable devices (such as a front-end module and an antenna). In various embodiments, the network interface 903 may be integrated with another component of the electronic device 900. The network interface 903 may implement a function of a communications unit in the foregoing embodiment.

The electronic device 900 may further include an input/output (I/O) device 905. The input/output (I/O) device 905 may include: a user interface through which a user can interact with the electronic device 900; a peripheral component interface through which a peripheral component can also interact with the electronic device 900; and/or a sensor, configured to determine an environmental condition and/or location information associated with electronic device 900.

It should be noted that FIG. 17 is merely used as an example. To be specific, although FIG. 17 shows that the electronic device 900 includes a plurality of components such as the processor 901, the controller hub 904, and the memory 902, in actual application, a device using the methods in this application may, include only some of the components of the electronic device 900, for example, may include only the processor 901 and the NIC 903. Properties of optional devices in FIG. 17 are shown by dashed lines.

The memory of the electronic device 900 may include one or more tangible and non-transitory computer-readable storage media, configured to store data and/or instructions. The computer-readable storage medium stores instructions, and specifically, stores temporary and permanent copies of the instructions.

In this application, the electronic device 900 may be specifically an authentication server, and the instructions stored in the memory of the electronic device may include instructions that enable the authentication server to implement the foregoing application login method when the instructions are executed by at least one unit in the processor.

In this application, the electronic device 900 may be specifically a client terminal, and the instructions stored in the memory of the electronic device may include instructions that enable the client terminal to implement the foregoing method for accessing an application server by an application when the instructions are executed by at least one unit in the processor.

Figure 18:
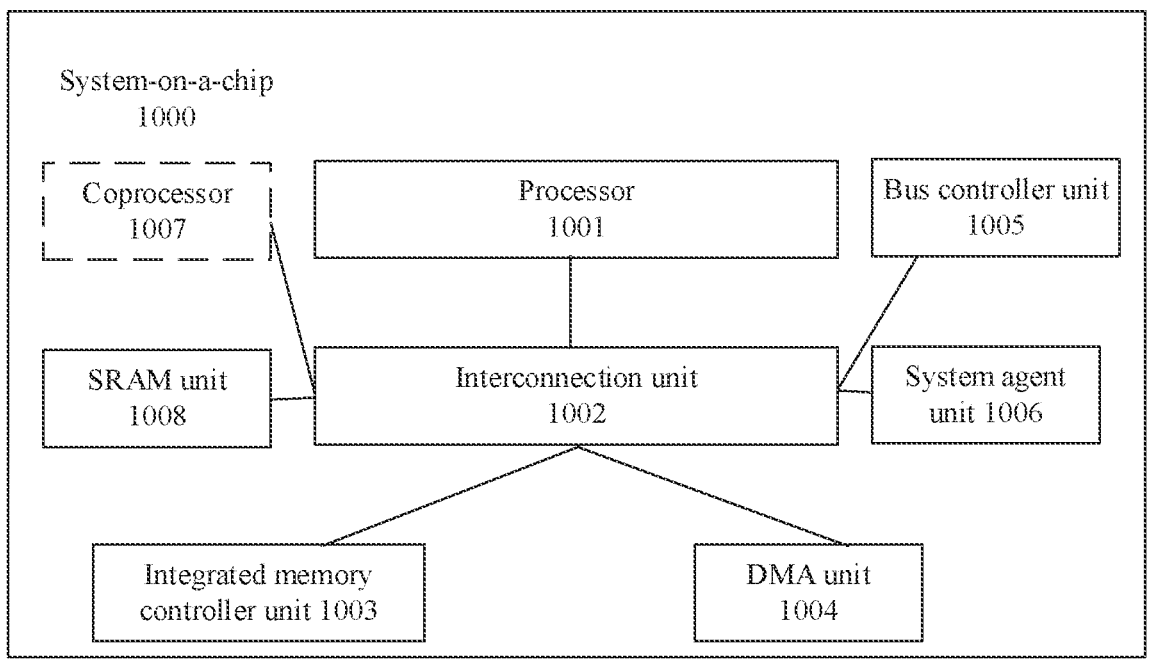
FIG. 18 is a schematic diagram of a structure of a system-on-a-chip (SOC) according to some embodiments of this application.

FIG. 18 is a schematic diagram of a structure of an SoC (System on Chip, system-on-a-chip) 1000 according to an implementation of this application. In FIG. 18, like parts have same reference numerals. In addition, a dashed-line box is an optional characteristic of a more advanced SoC 1000. The SoC 1000 may be used for any electronic device according to this application, for example, used for the client terminal according to any embodiment of this application, or used for the authentication server or the application server according to any embodiment of this application. A corresponding function may be implemented based on different devices in which the SoC 1000 is located and different instructions stored in the SoC 1000.

In FIG. 18, the SoC 1000 includes an interconnection unit 1002 coupled to a processor 1001, a system agent unit 1006, a bus controller unit 1005, an integrated memory controller unit 1003, a group of coprocessors 1007 or one or more coprocessors 1007 that may include integrated graphics logic, an image processor, an audio processor, and a video processor, an SRAM (static random access memory) unit 1008, and a DMA (direct memory access) unit 1004. In an embodiment, the coprocessor 1007 includes a dedicated processor, for example, a network or communications processor, a compression engine, a GPGPU, a high throughput MIC processor, or an embedded processor.

The SRAM unit 1008 may include one or more computer-readable storage media, configured to store data and/or instructions. The computer-readable storage medium may store instructions, and specifically, store temporary and permanent copies of the instructions. The instructions may include instructions that enable the authentication server to implement the foregoing application login method when the instructions are executed by at least one unit in the processor, or instructions that enable the client terminal to implement the foregoing method for accessing an application server by an application when the instructions are executed by at least one unit in the processor.

The embodiments of the mechanism disclosed in this application may be implemented in a manner such as software, hardware, firmware, or a combination of these implementation methods. The embodiments of this application may be implemented as a computer program or program code executed on a programmable system. The programmable program includes at least one processor and a memory (or a storage system, including volatile and non-volatile memories and/or a storage unit).

The program code may be applied to input the instructions to perform the functions described herein and generate output information. The output information may be applied to one or more output devices in a known manner. It may be understood that, in the embodiments of this application, a processing system may be a microprocessor, a digital signal processor (DSP), a microcontroller, an application-specific integrated circuit (ASIC), or the like, and/or any combination thereof. According to another aspect, the processor may be a single-core processor, a multi-core processor, or the like, and/or any combination thereof.

The program code may be implemented in a high-level programming language or an object-oriented programming language, to communicate with the processor. The program code may also be implemented by using an assembly language or a machine language when required. Indeed, the mechanisms described in this application are not limited to the scope of any particular programming language. In any case, the language may be a compiled language or an interpretive language.

In some cases, the disclosed embodiments may be implemented by hardware, firmware, software, or any other combinations. The disclosed embodiments may be implemented as instructions carried by or stored on one or more transitory or non-transitory machine-readable (for example, computer-readable) storage media. The instructions may be read and executed by one or more processors. For example, the instructions are distributed over a network or through a pneumatic computer-readable medium. Therefore, the machine-readable medium may include any mechanism for storing or transmitting information in a machine (for example, a computer) readable form, including, but not limited to, a floppy disk, a compact disc, an optical disc, a compact disc read-only memory (CD-ROM), a magneto-optical disc, a read-only memory (ROM), a random access memory (RAM), an erasable programmable read-only memory (EPROM), an electrically erasable programmable read-only memory (EEPROM), a magnetic card or an optical card, a flash memory, or a tangible machine-readable memory for transmitting information (for example, a carrier-wave, infrared, and digital signal) by using the internet in an electrical, optical, acoustic, or other forms. Therefore, the machine-readable medium includes any type of machine-readable medium suitable for storing or transmitting electronic instructions or information in a machine-readable form.

One or more aspects of at least one embodiment may be implemented by using representative instructions stored on a computer-readable storage medium. The instructions represent various logic in a processor, and when the instructions are read by a machine, the mechanism is enabled to act on the logic for performing the technologies described herein. These representations referred to as "IP cores" may be stored on a tangible computer-readable storage medium and provided to a plurality of customers or production devices for implementation to be loaded into a manufacturing machine that actually manufactures the logic or the processor.

In some cases, an instruction converter may be configured to transfer instructions from a source instruction set to a target instruction set. For example, the instruction converter may convert, in a transform (for example, a static binary transform, or a dynamic binary transform including dynamic compilation), morphing, emulation, or another manner, the instructions into one or more other instructions processed by a core. The instruction converter may be implemented by using software, hardware, firmware, or another combination. The instruction converter may be located on the processor, outside the processor, or partially on the processor and partially outside the processor.

It should be noted that, as used herein, the term "module" may refer to an application-specific integrated circuit (ASIC), an electronic circuit, a (shared, dedicated, or group) processor that executes one or more pieces of software or firmware programs and/or a memory, a combinational logic circuit, and/or another appropriate hardware component that provides the described functions, or may be used as a part of these hardware components. In other words, all modules in the device embodiments of this application are logical modules. Physically, one logical module may be a physical unit, or may be a part of a physical unit, or may be implemented by using a combination of a plurality of physical units. In addition, the device embodiments of this application do not introduce a module that is not closely related to resolving the technical problem in this application. This does not indicate that no other module exists in the foregoing device embodiments.

It should be noted that the communications module in this application may specifically include a transmitter and a receiver, or a transceiver, configured to provide a wireless communication function for a device in which the communications module is located, so that the device in which the communications module is located communicates with another device. For example, a terminal device is enabled to send screen projection data, and a playback device receives the screen projection data.

It should be noted that the terms "first", "second", and the like are merely used for distinction and descriptions, but cannot be understood as indicating or implying relative importance.

It should be noted that, in the accompanying drawings, some structural or method features may be shown in a particular arrangement and/or order. However, it should be understood that such a particular arrangement and/or order may not be required. In some embodiments, these features may be arranged in a manner and/or order different from that shown in the descriptive accompanying drawings. In addition, inclusion of the structural or method features in a particular figure does not imply that such features are required in all embodiments, and in some embodiments, these features may not be included or may be combined with other features.

Although this application has been illustrated and described with reference to some preferred implementations of this application, a person of ordinary skill in the art should understand that the foregoing content is detailed descriptions of this application further provided with reference to specific implementations, and it shall not be deemed that specific implementations of this application are limited to these descriptions. A person skilled in the art may make various changes to the implementations in forms and details, including making several simple deductions or replacements, without departing from the spirit and scope of this application.

What is claimed is:

1. An application login method, comprising:
    sending, by a client terminal, a login request, wherein the login request comprises authorization request information configured for use by a second client application executed in the client terminal, and requesting user home country/region identification information of a first client application;
    receiving, by an authentication server, the login request;
    generating, by the authentication server and based on the login request, authorization information in response to the authorization request information, and access information, based on the user home country/region identification information;
    sending, by the authentication server, the authorization information and the access information to the client terminal;
    receiving, by the client terminal, the authorization information and the access information; and
    accessing, by the client terminal, based on the authorization information and the access information, the second client application using an application server in the user home country/region of the first client application.

2. The application login method of claim 1, wherein the authorization request information comprises information for requesting an authorization code, initially configured address information of the application server of the client application, and an application identifier (ID) of the client application.

3. The application login method of claim 2, wherein an authentication server region is determined based on the initially configured address information, and wherein the authentication server region is inconsistent with the user home country/region.

4. The application login method of claim 1, further comprising:
    determining a user home country/region of the client application based on the user home country/region identification information;
    determining address information of the application server based on a locally configured correspondence between a home country/region and an application server address; and
    generating the access information comprising the address information of the application server.

5. The application login method of claim 4, wherein the address information of the application server is based on a callback address parameter.

6. An application login method, comprising:
    sending, by a client terminal, a login request, wherein the login request comprises authorization request information configured for use by a second client application executed in the client terminal to request to log in with a user account of a first client application executed in the client terminal, and wherein the login request comprises user home country/region identification information of the first client application;
    receiving, by an authentication server, the login request;
    generating, by the authentication server and based on the login request, authorization information in response to the authorization request, and access information, based on the user home country/region identification information, of an application server in a user home country/region of the first client application;
    sending the authorization information and the access information to the client terminal;
    receiving, by the client terminal, the authorization information and the access information; and
    sending, by the client terminal, to the second client application, the authorization information and the access information;
    accessing, by the second client application based on the authorization information and the access information, the application server.

7. The application login method of claim 6, wherein the authorization request information comprises information for requesting an authorization code, initially configured address information of the application server of the second client application, and an application ID of the second client application.

8. The application login method of claim 7, wherein an authentication server region is determined based on the initially configured address information of the application server of the second client application, and wherein the authentication server region is inconsistent with the user home country/region.

9. The application login method of claim 6, further comprising:
    determining a user home country/region of the first client application based on the user home country/region identification information;
    determining address information of the application server based on a locally configured correspondence between a home country/region and an application server address; and
    generating the access information comprising the address information of the application server.

10. The application login method of claim 9, wherein the address information of the application server is based on a callback address parameter.

11. The application login method of claim 10, wherein the callback address parameter is a Hypertext Transfer Protocol (HTTP) address.

12. The application login method of claim 9, wherein the authorization request information is an authorization software development kit (SDK).

13. The application login method of claim 6, wherein address information of the application server is based on a callback address parameter.

14. An application login method, applied to an authentication server, comprising:
    receiving a login request from a second client application, wherein the login request comprises authorization request information configured for use by the second client application to request to log in with a user account of a first client application, and user home country/region identification information of the first client application;
    generating, based on the login request, authorization information in response to the authorization request information, and access information, based on the user home country/region identification information of an application server in a user home country/region of the first client application; and
    sending the authorization information and the access information to the second client application.

15. The application login method of claim 14, further comprising:
    combining the access information and the authorization information into information for feeding back the login request; and
    sending the information.

16. The application login method of claim 14, further comprising:
- determining a user home country/region of the client application based on the user home country/region identification information;
- determining address information of the application server based on a locally configured correspondence between a home country/region and an application server address; and
- generating the access information comprising the address information of the application server.

17. The application login method of claim 16, wherein the address information of the application server is configured by using a callback address parameter.

18. The application login method of claim 14, wherein the authorization request information comprises information for requesting an authorization code, initially configured address information of the application server of the client application, and an application ID of the client application.

19. The application login method of claim 18, wherein an authentication server region is determined based on the initially configured address information of the application server of the client application, and wherein the authentication server region is inconsistent with the user home country/region.

20. The application login method of claim 14, wherein address information of the application server is based on a callback address parameter.

* * * * *